United States Patent
Kanagalingam et al.

(10) Patent No.: US 10,640,430 B2
(45) Date of Patent: May 5, 2020

(54) FERTILIZER CAPSULE COMPRISING ONE OR MORE CORES AND METHOD OF MAKING SAME

(71) Applicant: SAUDI BASIC INDUSTRIES CORPORATION, Riyadh (SA)

(72) Inventors: Sabeshan Kanagalingam, Riyadh (SA); Ravi Hegde, Bengaluru (IN); Madduri Srinivasarao, Bengaluru (IN); Anton Kumanan, Bengaluru (IN); Rajamalleswaramma Koripelly, Bengaluru (IN); Samik Gupta, Bengaluru (IN)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 0 days.

(21) Appl. No.: 15/114,578

(22) PCT Filed: Jan. 28, 2015

(86) PCT No.: PCT/IB2015/050654
§ 371 (c)(1),
(2) Date: Jul. 27, 2016

(87) PCT Pub. No.: WO2015/114542
PCT Pub. Date: Aug. 6, 2015

(65) Prior Publication Data
US 2016/0340265 A1 Nov. 24, 2016

Related U.S. Application Data

(60) Provisional application No. 61/934,296, filed on Jan. 31, 2014, provisional application No. 62/044,685, (Continued)

(51) Int. Cl.
*C05G 3/08* (2006.01)
*C05G 3/00* (2020.01)
*C05C 9/00* (2006.01)

(52) U.S. Cl.
CPC .............. *C05G 3/0017* (2013.01); *C05C 9/00* (2013.01); *C05C 9/005* (2013.01); *C05G 3/0041* (2013.01);
(Continued)

(58) Field of Classification Search
CPC ...... C05G 3/0017; C05G 3/08; C05G 3/0041; C05G 3/0047; C05C 9/00; C05C 9/005; Y02P 60/218
See application file for complete search history.

(56) References Cited

U.S. PATENT DOCUMENTS 3,056,723 A * 10/1962 Galloway .............. A01N 25/08
23/313 R
3,232,740 A 2/1966 Sor et al.
(Continued)

FOREIGN PATENT DOCUMENTS

| AU | 2015212412 | 9/1916 |
| AU | 667645 | 2/1995 |

(Continued)

OTHER PUBLICATIONS

Trenkel, Martin E. Controlled-release and stabilized fertilizers in agriculture. vol. 11. Paris: International fertilizer industry association, 1997.*

(Continued)

*Primary Examiner* — Jennifer A Smith
(74) *Attorney, Agent, or Firm* — Norton Rose Fulbright US LLP

(57) ABSTRACT

Fertilizer capsules, methods of making the fertilizer capsules, and uses of the fertilizer capsules are described. A fertilizer capsule can include one or more cores. Each core can include one or more fertilizer additives and 10 to 99 wt. % of an extrudable binder.

20 Claims, 13 Drawing Sheets

Related U.S. Application Data filed on Sep. 2, 2014, provisional application No. 62/085,706, filed on Dec. 1, 2014.

(52) U.S. Cl.
CPC ............ *C05G 3/0047* (2013.01); *C05G 3/08* (2013.01); *Y02P 60/218* (2015.11)

(56) References Cited

U.S. PATENT DOCUMENTS

| | | |
|---|---|---|
| 3,314,778 A | 4/1967 | Campbell et al. |
| 3,322,528 A | 5/1967 | Hamamoto |
| 3,326,665 A | 7/1967 | Schäfer et al. |
| 3,331,677 A | 7/1967 | Campbell et al. |
| 3,388,989 A | 6/1968 | Sor |
| 3,441,539 A | 4/1969 | Schafer et al. |
| 3,499,748 A | 3/1970 | Fraser |
| 3,825,414 A | 6/1974 | Lee et al. |
| 3,870,755 A | 3/1975 | Kamo et al. |
| 3,954,436 A | 5/1976 | Vad et al. |
| 3,961,329 A | 7/1976 | Naidich |
| 3,962,329 A | 7/1976 | Schoenaich et al. |
| 4,062,890 A | 12/1977 | Shank |
| 4,880,455 A * | 11/1989 | Blank .................. C05G 3/0029 71/28 |
| 4,994,100 A | 2/1991 | Sutton et al. |
| 5,124,451 A | 7/1992 | Hackl et al. |
| 5,169,954 A | 12/1992 | Hackl et al. |
| 5,264,019 A | 11/1993 | Gossett, Jr. et al. |
| 5,300,135 A | 4/1994 | Hudson et al. |
| 5,352,265 A | 10/1994 | Weston et al. |
| 5,399,186 A | 3/1995 | Derrah et al. |
| 5,414,083 A | 5/1995 | Hackl et al. |
| 5,597,917 A | 1/1997 | Hackl et al. |
| 5,645,624 A | 7/1997 | Naka et al. |
| 5,741,521 A * | 4/1998 | Knight .................. A01N 25/10 264/176.1 |
| 5,917,110 A | 6/1999 | Kust |
| 5,976,210 A | 11/1999 | Sensibaugh |
| 6,048,376 A | 4/2000 | Miller |
| 6,048,378 A | 4/2000 | Moore |
| 6,231,633 B1 | 5/2001 | Hirano et al. |
| 6,391,454 B1 | 5/2002 | Mao et al. |
| 6,500,223 B1 | 12/2002 | Sakai et al. |
| 6,576,035 B2 | 6/2003 | Hartmann et al. |
| 6,749,659 B1 | 6/2004 | Yu et al. |
| 6,900,162 B2 | 5/2005 | Wertz et al. |
| 6,936,573 B2 | 8/2005 | Wertz et al. |
| 6,936,681 B1 | 8/2005 | Wertz et al. |
| 7,213,367 B2 | 5/2007 | Wertz et al. |
| 8,163,058 B2 | 4/2012 | Whitehurst et al. |
| 8,419,819 B2 | 4/2013 | Sutton |
| 8,603,211 B2 | 12/2013 | Rahn et al. |
| 9,034,072 B2 | 5/2015 | Gabrielson et al. |
| 9,376,350 B2 | 6/2016 | Pursell et al. |
| 9,394,210 B2 | 7/2016 | Gabrielson et al. |
| 9,422,203 B2 | 8/2016 | Waliwitiya |
| 9,446,993 B2 | 9/2016 | Li et al. |
| 2003/0224031 A1 | 12/2003 | Heier et al. |
| 2004/0001884 A1 | 1/2004 | Moroni et al. |
| 2004/0016275 A1 | 1/2004 | Hartmann et al. |
| 2004/0016276 A1 | 1/2004 | Wynnyk et al. |
| 2004/0050127 A1 | 3/2004 | Ambri |
| 2004/0163434 A1 | 8/2004 | Quin |
| 2004/0182953 A1 | 9/2004 | Knoer |
| 2006/0089259 A1 | 4/2006 | Driessen et al. |
| 2006/0142157 A1 | 6/2006 | Birthisel et al. |
| 2009/0270257 A1 | 10/2009 | Pursell et al. |
| 2010/0011825 A1 | 1/2010 | Ogle et al. |
| 2010/0139348 A1 | 6/2010 | Wan et al. |
| 2011/0036009 A1 | 2/2011 | Bissonnette et al. |
| 2011/0275520 A1 | 11/2011 | Frey et al. |
| 2012/0017659 A1 | 1/2012 | Pursell et al. |
| 2012/0067094 A1 | 3/2012 | Pursell et al. |
| 2012/0090366 A1 | 4/2012 | Pursell et al. |
| 2013/0152649 A1 | 6/2013 | Kweeder et al. |
| 2013/0231493 A1 | 9/2013 | Shishkov et al. |
| 2014/0047884 A1 | 2/2014 | Gabrielson et al. |
| 2014/0102156 A1 | 4/2014 | Pursell et al. |
| 2014/0255605 A1 | 9/2014 | Van Kaathoven et al. |
| 2015/0031786 A1 | 1/2015 | Lambeth |
| 2015/0052960 A1 | 2/2015 | Makin et al. |
| 2015/0101379 A1 | 4/2015 | Gabrielson et al. |
| 2015/0152017 A1 | 6/2015 | Schumski et al. |
| 2015/0197460 A1 | 7/2015 | Gabrielson et al. |
| 2016/0075609 A1 | 3/2016 | Gabrielson et al. |
| 2016/0076062 A1 | 3/2016 | Medoff et al. |
| 2016/0340265 A1 | 11/2016 | Kanagalingam et al. |
| 2018/0208513 A1 | 7/2018 | Kanagalingam et al. |
| 2018/0297903 A1 | 10/2018 | Ledoux et al. |

FOREIGN PATENT DOCUMENTS

| | | |
|---|---|---|
| CA | 2441175 A1 | 3/2004 |
| CA | 2701995 A1 | 10/2011 |
| CN | 1126465 | 7/1996 |
| CN | 1145059 A | 3/1997 |
| CN | 1666972 A | 9/2005 |
| CN | 101134697 | 3/2008 |
| CN | 101177365 A | 5/2008 |
| CN | 101289350 A | 10/2008 |
| CN | 101289353 A | 10/2008 |
| CN | 101323545 | 12/2008 |
| CN | 101723752 | 6/2010 |
| CN | 102143927 | 8/2011 |
| CN | 102295491 | 12/2011 |
| CN | 102557838 | 7/2012 |
| CN | 102826917 | 12/2012 |
| CN | 103319120 | 9/2013 |
| CN | 104261723 | 1/2015 |
| CN | 104311366 | 1/2015 |
| CN | 104326847 | 2/2015 |
| DE | 1146080 | 3/1963 |
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 A | 5/1976 |
| GB | 1535807 | 12/1978 |
| JP | H0733576 | 2/1995 |
| JP | H11263689 | 9/1999 |
| JP | H11278973 | 10/1999 |
| JP | 2001294792 | 10/2001 |
| KR | 100974639 | 8/2010 |
| NZ | 596113 A | 8/2012 |
| TW | I549926 B | 9/2016 |
| WO | WO 2016/091205 | 6/1916 |
| WO | WO 2016/107548 | 7/1916 |
| WO | WO 2016/186526 | 11/1916 |
| WO | WO 2017/013572 | 1/1917 |
| WO | WO 2017/013573 | 1/1917 |
| WO | WO 2017/081183 | 5/1917 |
| WO | WO 2017/087264 | 5/1917 |
| WO | WO 2017/087265 | 5/1917 |
| WO | WO 2017/100507 | 6/1917 |
| WO | WO 2017/137902 | 8/1917 |
| WO | WO 2017/168288 | 10/1917 |
| WO | WO 2018/193344 | 10/1918 |
| WO | WO 2018/193345 | 10/1918 |
| WO | WO 2018/193358 | 10/1918 |
| WO | WO 2019/030671 | 2/1919 |
| WO | WO 1989/000079 | 1/1989 |
| WO | WO-95/26942 A1 | 10/1995 |
| WO | WO 1995/026942 | 10/1995 |

(56) References Cited

FOREIGN PATENT DOCUMENTS

| | | |
|---|---|---|
| WO | WO-96/18591 A1 | 6/1996 |
| WO | WO 1996/018591 | 6/1996 |
| WO | WO 2003/066207 | 8/2003 |
| WO | WO 2004/047974 | 6/2004 |
| WO | WO 2004/098858 | 11/2004 |
| WO | WO-2005/075602 A1 | 8/2005 |
| WO | WO 2006/044393 | 4/2006 |
| WO | WO-20061044393 A2 | 4/2006 |
| WO | WO 2007/041234 | 4/2007 |
| WO | WO-2007/086773 A1 | 8/2007 |
| WO | WO 2013/017888 | 2/2013 |
| WO | WO-2013/019121 A1 | 2/2013 |
| WO | WO-2013017888 A1 * | 2/2013 ............... C05F 7/00 |
| WO | WO-2013/121384 A2 | 8/2013 |
| WO | WO 2014/189183 | 11/2014 |
| WO | WO-2015/001457 A2 | 1/2015 |
| WO | WO-2015/114542 A1 | 8/2015 |
| WO | WO 2015/170217 | 11/2015 |
| ZA | 201105819 | 4/2012 |

OTHER PUBLICATIONS

Al-Kanani, T., A. F. MacKenzie, and H. Blenkhorn. "Volatilization of ammonia from urea-ammonium nitrate solutions as influenced by organic and inorganic additives." Fertilizer research 23.2 (1990): 113-119.*

Upadhyay, Lata Sheo Bachan. "Urease inhibitors: A review." Indian Journal of Biotechnology vol. 11 (2012): 381-388.*

International Preliminary Report on Patentability was dated Aug. 2, 2016 by the International Searching Authority for Application No. PCT/IB2015/050654, which was filed on Jan. 28, 2015 and published as WO 2015/114542 (Applicant—Sabic Global Technologies B.V.) (7 pages).

International Search Report and Written Opinion were dated Oct. 24, 2016 by the International Searching Authority for Application No. PCT/IB2016/054271, which was filed on Jul. 18, 2016 (Applicant—Sabic Global Technologies B.V.) (26 pages).

International Search Report and Written Opinion were dated Oct. 20, 2016 by the International Searching Authority for Application No. PCT/IB2016/054271, which was filed on Jul. 18, 2016 (Applicant—Sabic Global Technologies B.V.) (25 pages).

Allison FE. (1955) "The enigma of soil nitrogen balance sheets," Adv. Agro., 7: 213-250.

Chien SH, et al. (2009) " Recent developments of fertilizer production and use to improve nutrient efficiency and minimize environmental impacts," Adv. Agro.,102: 267-322.

Ciurli S, et al. (1999) "Structural properties of the nickel ions in; urease: novel insights into the catalytic and inhibition mechanisms," Coord. Chem. Rev., 190-192: 331.

Hays JT. (1971) "Symposium on Controlled Release Fertilizer," J. Agri. Food chem., 19: 797-797.

Patra DD, et al. (2009) "Use of urea coated with natural products to inhibit urea hydrolysis and nitrification in soil," Biol. Fertil. Soils, 45: 617-621.

Subbarao GV, et al. (2006) "Scope and Strategies for Regulation of Nitrification in Agricultural Systems—Challenges and Opportunities," Crit. Rev. Plant Sci., 25: 303-335.

International Search Report and Written Opinion dated May 19, 2015 for application PCT/IB2015/050654, filed on Jan. 28, 2015 and published as WO 2015/114542 on Aug. 6, 2015 (Applicant—Saudi Basic Industries Corporation // Inventor—Kanagalingam, et al.) (11 pages).

Office Action issued in corresponding Chinese Patent Application No. 201580008733.2, dated Jan. 11, 2019. (Machine Translation Provided).

Al-Kanani et al., "Volatilization of ammonia from urea-ammonium nitrate solutions as influenced by organic and inorganic additives." *Fertilizer Research*, 1990, 23, 113-119.

Al-Zahrani, S.M., "Utilization of Polyethylene and Paraffin Waxes as Controlled delivery Systems for Different Fertilizers" *Ind. Eng. Chem. Res.*, 2000, 39(2):367-371.

Bolan et al., "Soil Acidification and Liming Interactions with Nutrient and Heavy Metal Transformation and Bioavailability," *Advances in Agronomy*, 2003, 78:215-272.

Bose, et al., "New protocol for Biginelli reaction-a practical synthesis of Monastrol," *Arkivoc*, 2005, 3:228-236.

Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

Gioacchini, et al., "Influence of urease and nitrification inhibitors on N. losses from soils fertilized with urea," Biology and Fertility of Soils, 2002, 36(2):129-135.

International Preliminary Report on Patentability issued in International Patent Application No. PCT/IB2016/054271, dated Oct. 18, 2017.

International Search Report and Written Opinion issued in counterpart International Application No. PCT/IB2015/053056, dated Sep. 23, 2015.

International Search Report and Written Opinion issued in International Application No. PCT/IB2016/054270, dated Oct. 24, 2016.

International Search Report and Written opinion issued in International Application No. PCT/IB2018/052577, dated Aug. 1, 2018.

International Search Report and Written opinion issued in International Application No. PCT/IB2018/052578, dated Aug. 1, 2018.

International Search Report and Written Opinion issued in International Application No. PCT/IB2018/052630, dated Aug. 9, 2018.

International Search Report and Written opinion issued in International Application No. PCT/IB2018/055946, dated Dec. 3, 2018.

International Search Report and Written opinion issued in International Application No. PCT/IB2017/050683, dated Jun. 20, 2017.

Jarosiewicz & Tomaszewska, "Controlled-release NPK fertilizer encapsulated by polymeric membranes." *Journal of Agricultural and Food Chemistry*, 2003, 51(2):413-417.

Kawakami, et al., "Physiological and yield responses of field-grown cotton to application of urea with the urease inhibitor NBPT and the nitrification inhibitor DCD," *European Journal of Agronomy*, 2012, 43:147-154.

Lunt, et al., "Properties and Value of 1,1-Diureido Isobutane (IBDU) as a Long-Lasting Nitrogen Fertilizer," *J. Agr. Food Chem.*, 1969, 17(6):1269-1271.

Mahmood et al., "Calcium Carbide-Based Formulations cause Slow Release of Acetylene and Ethylene in Soil and Nitrification Inhibition," *Communications in Soil Science and Plant Analysis*, 2014, 45(17): 2277-2288.

Mahmood et al., "Effect of rate and application depth matrix-I calcium carbide based formulation on growth, yield and nitrogen uptake of wheat," *African Journal of Agricultural Research*, 2011, 6(30): 6363-6398.

Mahmood et al., "Nutritional and physiological response of wheat to soil applied matrix-I formulated calcium carbide with and without nitro gen fertilizer," *Pakistan Journal of Nutrition* 2012, 11(2): 154-159.

Office Action issued in corresponding Chinese Patent Application No. 201680051745.8, dated Jul. 23, 2019.

Office Action and Search Report issued in corresponding Taiwanese Patent Application No. 104114189, dated May 9, 2019.

Office Action issued in corresponding Chinese Patent Application No. 2015800087332, dated Jun. 13, 2019.

Office Action issued in corresponding Indian Patent Application No. 201617028561, dated Jun. 18, 2019.

Office Action issued in corresponding Taiwanese Patent Application No. 105122936, dated Sep. 5, 2019.

Office Action issued in European Patent Application No. 16741394.7, dated Dec. 7, 2018.

Reddy, et al., "New environmentally friendly solvent free syntehesis of dihydropyrimidinones catalysed by N-butyl-N, N-dimethylphenylethylammonium bromide, *Tetrahedron Letters*, 2003, 44:8173-8175.

(56) References Cited

OTHER PUBLICATIONS

Sanz-Cobena, et al., "Gaseous emissions of N20 and No. And NO3—leaching from urea applied with urease and nitrification inhibitors to a maize (*Zea mays*) crop," *Agriculture, Ecosystems& Environment*, 2012, 149:64-73.
Sinclair et al., "Radiation Use Efficiency," *Advances in Agronomy*, 1999, 65: 215-265.
Soares, et al., "Ammonia volatilization losses from surface-applied urea with urease and nitrification inhibitors," *Soil Biology and Biochemistry*, 2012, 52:82-89.
Trenkel, "Controlled-release and stabilized fertilizers in agriculture." *International Fertilizer Industry Association*, 1997, 11:1-156.
Upadhyay,"Urease inhibitors: A review." *Indian Journal of Biotechnology*, 2012, 11:381-388.
Watson, et al., "Rate and mode of application of the urease inhibitor N-(n-butyl) thiophosphoric triamide on ammonia volatilization from surface-applied urea," *Soil Use and Management*, 2008, 24:246-253.
Wu, et al., "Guidelines for the Use of Fertilizers," *Chinese Agricultural Press*, 2000, 122-123. (English Translation).
Zaman, et al., "Improving pasture growth and urea efficiency using N inhibitor, molybdenum and elemental Sulphur," *Journal of Soil Science and Plant Nutrition*, 2014, 14(1):245-257.

\* cited by examiner

FERTILIZER CAPSULE COMPRISING ONE OR MORE CORES AND METHOD OF MAKING SAME

CROSS-REFERENCE TO RELATED APPLICATIONS

This is a U.S. National Phase Application of International Application No. PCT/IB2015/050654, filed Jan. 28, 2015, which claims the benefit of U.S. Provisional Application No. 61/934,296, filed on Jan. 31, 2014, U.S. Provisional Application No. 62/044,685, filed on Sep. 2, 2014, and U.S. Provisional Application No. 62/085,706, filed on Dec. 1, 2014, which are all incorporated herein by reference in their entirety.

FIELD OF INVENTION

This disclosure relates to fertilizer capsule comprising a binder, and methods for making such fertilizer capsule.

BACKGROUND

Continuous use of fertilizers leads to loss of soil fertility and nutrient balance. To increase the crop yield and satisfy the growing need of increasing population, more fertilizers are being used. In addition, large application or usage of urea, its rapid hydrolysis and nitrification in the soil is causing deterioration of soil health and environmental issues such as greenhouse emissions and ground water contamination.

To improve the soil fertility, the farmers are applying micronutrient fertilizers and/or inhibitors in addition to the regular fertilizers. Because it is a separate application, there is a chance of over-application, under-application and mis-application (wrong time, wrong ratio etc.). Separate applications are also more laborious.

Thus, there is a need for an improved fertilizer capsule with improved application properties. Such fertilizer capsule and methods related thereto are disclosed herein.

SUMMARY OF THE INVENTION

In accordance with the present invention, disclosed herein is a fertilizer capsule comprising one or more cores, wherein each core independently comprises one or more fertilizer additives and a binder, and wherein the core comprises from 10 wt % to 99 wt % of the binder.

Also disclosed herein is a fertilizer capsule comprising a core comprising an inhibitor or a micronutrient or a combination thereof and a binder, wherein the inhibitor comprises N-(n-butyl) thiophosphoric triamide (NBTPT), 3,4-dimethylpyrazole phosphate (DMPP), thio-urea (TU), dicyandiamide (DCD), phenyl phosphorodiamidate (PPDA), 2-Chloro-6-(trichloromethyl)-pyridine (Nitrapyrin), 5-Ethoxy-3-trichloromethyl-1,2,4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof, and wherein the core comprises from 10 wt % to 99 wt % of the binder.

Also disclosed herein is a method preparing a fertilizer capsule core comprising the step of: a) extruding a mixture comprising one or more fertilizer additives and an extrudable binder, thereby forming a core.

Also disclosed herein is a method for preparing a fertilizer capsule core comprising the step of: a) extruding a mixture comprising an inhibitor or a micronutrient or a combination thereof and a binder, thereby forming a core, wherein the inhibitor comprises NBTPT, DMPP, TU, DCD, PPDA, Nitrapyrin, Terrazole, AM, MBT or ST or a combination thereof. A micronutrient is a botanically acceptable form of an inorganic or organometallic compound comprising boron (B), copper (Cu), iron (Fe), chloride (CO, manganese (Mn), molybdenum (Mo), Nickel (Ni), or zinc (Zn), or a combination thereof.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying Figures, which are incorporated in and constitute a part of this specification, illustrate several aspects and together with the description serve to explain the principles of the invention.

Figures 1A, 1B:
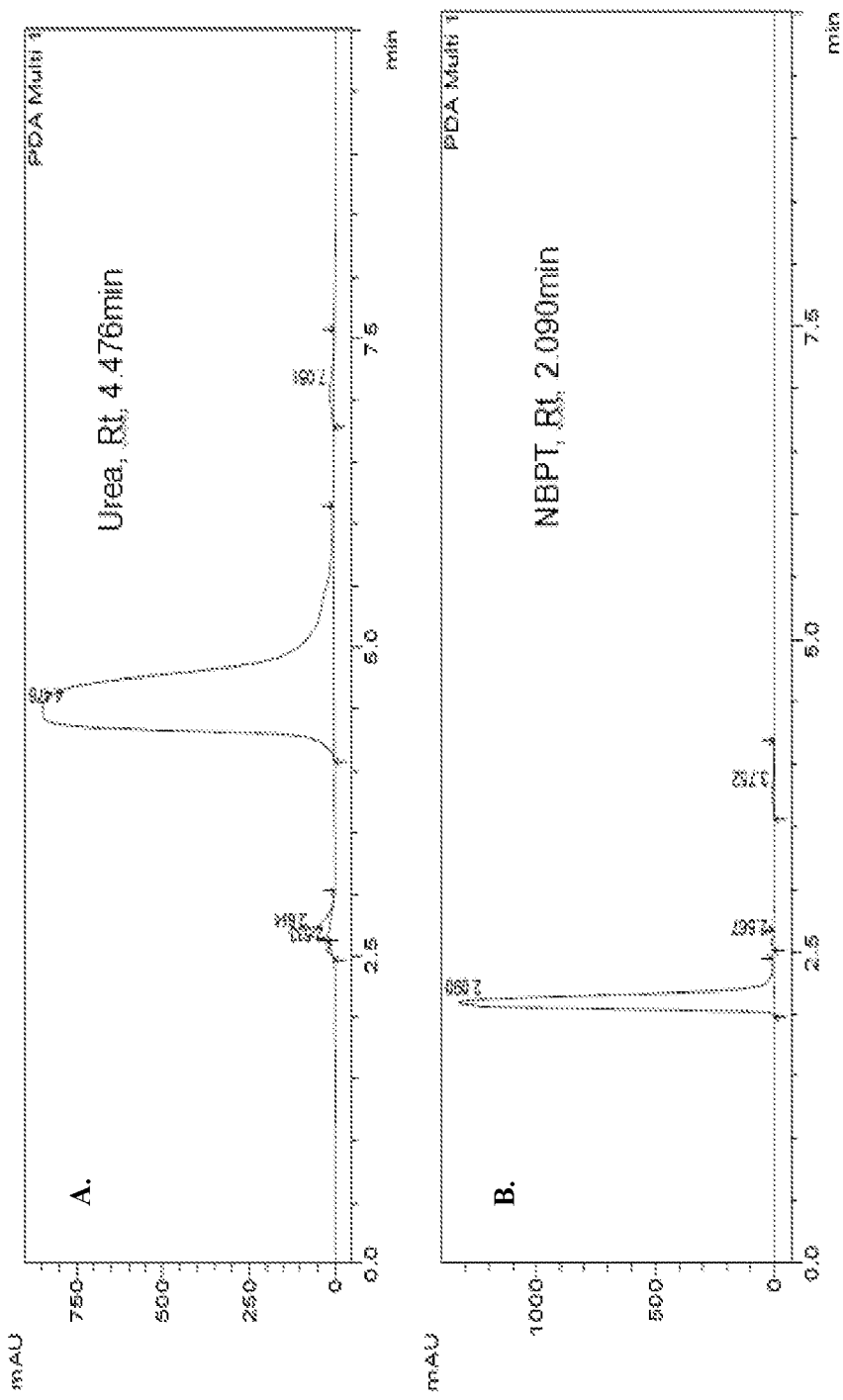
FIG. 1A-1C show the high-performance liquid chromatography (HPLC) data for commercially available urea, NBTPT, and DCD and the retention time respectively.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the examples included therein.

Before the present fertilizer compositions, articles, systems, devices, and/or methods are disclosed and described, it is to be understood that they are not limited to specific methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. DEFINITIONS

As used herein, nomenclature for compounds and fertilizer compositions can be given using common names as well as names assigned by the International Union of Pure and Applied Chemistry (IUPAC), Chemical Abstracts Service (CAS) recommendations for nomenclature, and the *Manual for Determining the Physical Properties of Fertilizer*, hereby incorporated herein by reference. One of skill in the art can readily ascertain the structure of a compound and fertilizer composition if given a name by systemic reduction of the compound structure using naming conventions.

As used in the specification and the appended claims, the singular forms "a," "an," and "the" include plural referents unless the context clearly dictates otherwise.

As used herein, the term "other nitrogen fertilizer" refers to a fertilizer comprising one or more nitrogen atoms that is not urea. Non-limiting examples of other nitrogen fertilizers include ammonium nitrate, ammonium sulfate, diammonium phosphate (DAP), monoammonium phosphate (MAP), urea-formaldehyde, ammonium chloride, and potassium nitrate.

As used herein, the term "other biomaterial" as it relates to the filler refers to biomaterials that are biodegradable. Non-limiting examples of other biomaterials include rice husk, and dried distillers grains with solubles (DDGS).

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component denotes the weight relationship between the element or component and any other elements or components or article for which a part by weight is expressed. Thus, in a composition comprising two parts by weight of component X and five parts by weight component Y, X and Y are present at a weight ratio of 2:5 or 2/5 or 0.4, and are present in such ratio regardless of whether additional components are contained in the compound. Additionally, references in the specification and concluding claims to molar ratios of a particular element or component denotes the molar relationship between the element or component and any other elements or components in the composition or article for which a molar ratio is expressed. Thus, in a composition containing five moles of component X and two moles component Y, X and Y are present at a molar ratio of 5:2 or 5/2 or 2.5 and are present in such ratio regardless of whether additional components are contained in the composition.

A weight percent (wt %) of a component, unless specifically stated to the contrary, is based on total weight of the formulation or composition in which the component is included.

As used herein, the terms "optional" or "optionally" means that a subsequently described event or circumstance can or cannot occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow, plain meaning derived from grammatical organization or punctuation, and number or type of embodiments described in the specification.

Disclosed are components to be used to prepare fertilizer compositions as well as the fertilizer compositions themselves to be used within the methods disclosed herein. These and other compounds are disclosed herein, and it is understood that when combinations, subsets, interactions, groups, etcetera, of these materials are disclosed that while specific reference of each various individual and collective combinations and permutation of these components cannot be explicitly disclosed, each is specifically contemplated and described herein. For example, if a particular fertilizer composition is disclosed and discussed and a number of modifications that can be made to a number of compounds including the fertilizer compositions are discussed, specifically contemplated is each and every combination and permutation of the composition and modifications that are possible unless specifically indicated to the contrary. Thus, if a class of compounds A, B, and C are disclosed as well as a class of fertilizer compositions D, E, and F and an example of a fertilizer composition, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using fertilizer compositions. Thus, if there are a variety of additional steps that can be performed, it is understood that each of these additional steps can be performed with any specific embodiment or combination of embodiments of the methods of the invention.

As used herein, the term "abrasion resistance" means resistance to formation of dust and fines that result in granule-to-granule and granule-to-equipment contact. It is also useful for estimating material losses; handling, storage and application properties; and pollution control requirements. Abrasion resistance is determined by measuring the percentage of dust and fines created by subjecting a sample to abrasive-type action.

As used herein, the term "crushing strength" means minimum force required to crush an individual fertilizer granule. Crushing strength is useful in predicting the expected handling and storage properties of granular fertilizer compositions, as well as the pressure limits applied during bag and bulk storage. The crushing strength is measured by applying pressure to granules of a specified range and recording the pressure required to fracture them.

As used herein, the term "bulk density (loose)" means mass per unit volume of a material after it has been poured freely into a container under clearly specified conditions. Bulk density is a measure of the material density, material porosity, and voids between the particles of a material. Loose-pour density represents minimum density (greatest volume occupancy) expected from a given material.

As used herein, the term "critical relative humidity," abbreviated CRH, is the atmospheric humidity above which a fertilizer composition will absorb a significant amount of moisture and below which it will not absorb a significant amount of moisture. For every fertilizer composition, there is a maximum relative humidity to which it can be exposed without absorbing moisture from the air. This value also indicates a degree of protection required during handling. The procedure for determination of CRH involved exposure of a sample of a fertilizer composition of the present invention to progressively higher relative humidity in a variable humidity chamber. The lowest humidity that initiated significant moisture pickup determined by frequent weighing of the sample was the CRH.

As used herein, the term "hygroscopicity" means the degree to which a material will absorb moisture from the atmosphere. Hygroscopicity of fertilizer compositions can determine conditions under which bulk fertilizer can be stored and also flowability during handling and field application. Fertilizers vary in their ability to withstand physical deterioration, such as wetting and softening, when exposed to humidity. Even fertilizers with similar CRH values can behave differently as a result of differences in moisture holding capacity. Thus, CRH alone is not sufficient to determine hygroscopicity of a fertilizer composition. Accordingly, hygroscopocities of fertilizer compositions can be compared by imposing various periods of humid exposure on samples contained in completely filled, open-top glass cups. The hygroscopicity tests consisted of moisture absorption, which is rate of moisture pickup per unit of exposed surface; moisture penetration, which is depth of moisture penetration or visible wetting of the fertilizer; moisture holding capacity, which is amount of moisture that individual granules will absorb before allowing moisture to be transferred by capillary action to adjacent particles; and integrity of wetted granules, which is determined quantitatively by handling the top surface layer of a sample after it has been exposed to a humid atmosphere.

B. FERTILIZER COMPOSITIONS

Urea is one of the most widely used fertilizers because of its high nitrogen content (46.6%). Unfortunately, urea has several drawbacks such as a) high water solubility that leads to leaching in the soil before plants can assimilate it, b) rapid hydrolysis by urease enzyme to form carbon dioxide and ammonia, c) an abrupt overall pH increase. Under ideal conditions, the urea hydrolyzed product, ammonia is converted to ammonium, ready for plant uptake. However, under less than ideal conditions (pH<6 or >8) the ammonia can be lost to the atmosphere, etc. (S. H. Chien., et al., *Adv. Agro.*, 2009, 102, 267). The ammonia that is produced from the urease catalyzed hydrolysis of urea further reacts with soil water to provide ammonium cation. Subsequently the ammonium cation gets oxidized biologically to nitrite and nitrate by *nitrosomonas* and *nitrobacter* bacteria. This process is known as nitrification. The conversion of a relatively immobile nitrogen form (ammonium) to a nitrogen that is highly mobile (nitrate) makes the soil nitrogen susceptible to losses through multiple pathways like, leaching of nitrate, gaseous losses of nitrogen in the form of $N_2$, NO, $N_2O$. Allison and Lundt have reported that as much as 75% of the nitrogen may be lost in area with high and intermittent precipitation (F. E. Allison, *Adv. Agro.*, 1955, 7, 213; J. T. Hays, *J. Agri. Food Chem.*, 1971, 19, 797). These adverse effects caused by application of urea leads to significant negative environmental and economic impact.

Different approaches have been proposed to reduce the nitrogen loss from fertilizers. One such approach is to encapsulate fertilizer granules with a material, which has low water permeability. Such encapsulated fertilizer granule would retard the release of fertilizer so that plants get more time for assimilation. The other possible approach would be to use urease and/or nitrification inhibitor that would slow down the activity of the particular enzyme or the microorganism. Both of these approaches have been extensively explored to develop enhanced efficiency fertilizers (S. H. Chien., et al., *Adv. Agro.*, 2009, 102, 267; F. E. Allison, *Adv. Agro.*, 1955, 7, 213; J. T. Hays, *J. Agri. Food Chem.*, 1971, 19, 797; S. Ciurli, et al., *Coord. Chem. Rev.*, 1999, 190-192, 331; G. V. Subbarao, et al., *Crit. Rev. Plant Sci.*, 2006, 25, 303)).

A number of urease and nitrification inhibitors have been developed to enhance the efficiency of fertilizer, but their application is very limited due to its stability in the soil at various conditions such as pH, temperature, precipitation, etc. For example, N-(n-butyl) thiophosphoric triamide (NBTPT) is known to be a good inhibitor of urease but it is unstable under acidic pH. Likewise, dicyandiamide (DCD) is one of the commercially used nitrification inhibitors but it cannot be used in hot climatic region due to its thermal instability in the soil.

It is also known that nitrogen loss can be reduced when an inhibitor is applied with or within urea fertilizer. Agrotain (NBTPT coated urea granules), for example is proved to prevent urease enzyme from breaking down urea for up to 14 days. In another study, granulated mixture of molten urea and inhibitor showed beneficial effect (U.S. Pat. No. 4,994, 100 to Balser et al.). However, these techniques have not addressed the problem of thermal and/or pH sensitivity of the inhibitors.

To overcome these issues disclosed herein is a fertilizer wherein the active ingredients are within the central particle, which can then fattened with urea or other nitrogen fertilizer, or a combination thereof. The outer coating of urea will first come in contact with the soil protecting the active ingredients, and the central particle will get released gradually. Furthermore, the active ingredients can come in contact with the soil in a phased manner upon dissolution of outer urea shell to elicit its effect.

Disclosed herein is a fertilizer capsule comprising one or more cores, wherein each of the one or more cores independently comprises one or more fertilizer additives and a binder, and wherein each of the one or more cores comprises from 10 wt % to 99 wt % of the binder.

In one aspect, the fertilizer capsule comprises two or more cores. In yet another aspect, the fertilizer capsule comprises one core. In yet another aspect, the fertilizer capsule consists of one core and a shell.

The one or more fertilizer additives can be mixed with the binder prior to extrusion. Such mixing can be done with a number of methods that are known in the art. For example, the mixing can be done by mechanically stirring the one or more fertilizer additives with the binder.

In one aspect, the one or more fertilizer additives are selected from an inhibitor, a micronutrient, a primary nutrient, or a secondary nutrient, or combination thereof. For example, the one or more fertilizer additives can comprise a micronutrient. In another example, the one or more fertilizer additives can comprise a primary nutrient. In yet another example, the one or more fertilizer additives can comprise an inhibitor. In yet another example, the one or more fertilizer additives can comprise a secondary nutrient. In yet another example, the one or more fertilizer additives can comprise a micronutrient and a secondary nutrient. In yet another example, the one or more fertilizer additives can comprise a micronutrient and a primary nutrient. In yet another example, the one or more fertilizer additives can comprise a micronutrient and an inhibitor. In yet another example, the one or more fertilizer additive comprises an inhibitor or a micronutrient and one or more additional fertilizer additives selected from an inhibitor, a micronutrient, a primary nutrient, or a secondary nutrient, or combination thereof. In yet another example, the one or more fertilizer additive comprises an inhibitor and a micronutrient and one or more additional fertilizer additives selected from an inhibitor, a micronutrient, a primary nutrient, or a secondary nutrient, or combination thereof.

In one aspect, each of the one or more cores independently comprises from greater than 0 wt % to 90 wt % of the one or more fertilizer additives. For example, each of the one or more cores independently can comprise from greater than 0 wt % to 70 wt % of the one or more fertilizer additives. In another example, each of the one or more cores independently can comprise from greater than 0 wt % to 50 wt % of the one or more fertilizer additives. In yet another example, each of the one or more cores independently can comprise from greater than 0 wt % to 30 wt % of the one or more fertilizer additives. In yet another example, each of the one or more cores independently can comprise from greater than 0 wt % to 10 wt % of the one or more fertilizer additives. In yet another example, each of the one or more cores independently can comprise from greater than 0 wt % to 5 wt % of the one or more fertilizer additives. In yet another example, each of the one or more cores independently can comprise from 5 wt % to 70 wt % of the one or more fertilizer additives. In yet another example, each of the one or more cores independently can comprise from 5 wt % to 50 wt % of the one or more fertilizer additives. In yet another example, each of the one or more cores independently can comprise from 5 wt % to 30 wt % of the one or more fertilizer additives. In yet another example, each of the one or more cores independently can comprise from 10 wt % to 30 wt % of the one or more fertilizer additives. In yet another example, each of the one or more cores independently can comprise from 10 wt % to 50 wt % of the one or more fertilizer additives. In yet another example, each of the one or more cores independently can comprise from 30 wt % to 90 wt % of the one or more fertilizer additives. In yet another example, each of the one or more cores independently can comprise from 30 wt % to 70 wt % of the one or more fertilizer additives. In yet another example, each of the one or more cores independently can comprise from 30 wt % to 50 wt % of the one or more fertilizer additives.

Also disclosed herein is a fertilizer capsule comprising a core comprising an inhibitor or a micronutrient or a combination thereof and a binder, wherein the inhibitor comprises N-(n-butyl) thiophosphoric triamide (NBTPT), 3,4-dimethylpyrazole phosphate (DMPP), thio-urea (TU), dicyandiamide (DCD), phenyl phosphorodiamidate (PPDA), 2-Chloro-6-(trichloromethyl)-pyridine (Nitrapyrin), 5-Ethoxy-3-trichloromethyl-1,2,4-thiadiazol (Terrazole), 2-Amino-4-chloro-6-methyl-pyrimidine (AM), 2-Mercapto-benzothiazole (MBT), or 2-Sulfanimalamidothiazole (ST), or a combination thereof, and wherein the core comprises from 10 wt % to 99 wt % of the binder.

The core can be produced via an extrusion process. The extrusion process can occur at a temperature from 0° C. to 140° C. The extrusion process can occur at a screw speed from 1 to 500 rpm.

In one aspect, the fertilizer capsule can comprise an outer shell comprising urea or other nitrogen fertilizer or a combination thereof, wherein the outer shell at least partially surrounds the core. In one aspect, the outer shell substantially surrounds the core. In another aspect, the outer shell fully surrounds the core. An outer shell is a shell that is "outer" in relation to the core. It is appreciated that another an outer shell can be further covered with another material (layer) and, thus, would not be the most outer layer of the fertilizer capsule.

The core can be fattened with urea or other nitrogen fertilizer or combination thereof to produce the fertilizer capsule. Such process, producing the fertilizer capsule, can be achieved via a granulation process, wherein molten urea is sprayed onto the cores.

In one aspect, the fertilizer capsule comprises from 50 wt % to 99 wt % of the outer shell. For example, the fertilizer capsule can comprises from 50 wt % to 95 wt % of the outer shell. In another example, the fertilizer capsule comprises from 50 wt % to 70 wt % of the outer shell. In another example, the fertilizer capsule comprises from 70 wt % to 99 wt % of the outer shell. In another example, the fertilizer capsule comprises from 85 wt % to 99 wt % of the outer shell. In another example, the fertilizer capsule comprises from 90 wt % to 99 wt % of the outer shell.

In one aspect, the core comprises an inhibitor and a micronutrient. In another aspect, the core comprises an inhibitor. In yet another aspect, the core comprises a micronutrient. In yet another aspect, the core comprises an inhibitor and not a micronutrient. In yet another aspect, the core comprises a micronutrient and not an inhibitor.

In one aspect, the core further comprises urea or other nitrogen fertilizer or a combination thereof. For example, the core can comprise urea.

In one aspect, the core further comprises a filler.

In one aspect, the core has a size from 0.7 mm to 2.0 mm. For example, the core can have a size from 0.9 mm to 1.5 mm. The core can have a substantial spherical shape. The substantial spherical shape results from spheronization of the core once produced as cylinders from the extrusion process.

In one aspect, the fertilizer capsule can have any shape. For example, the fertilizer capsule can have a spherical, puck, oval, or oblong shape.

In one aspect, the fertilizer capsule has a longest dimension from 1.5 mm to 8.0 mm. For example, the fertilizer capsule can have a longest dimension from 2.0 mm to 4.0 mm.

In one aspect, the core comprises from greater than 0 wt % to 4.0 wt % of moisture content. For example, the core can comprise from greater than 0 wt % to 0.5 wt % of moisture content, or from 1 wt % to 3 wt % of moisture content.

In one aspect, the core has a crush strength of at least 2 kg/granule. For example, the core can have a crush strength of at least 5 kg/granule. In another example, the core can have a crush strength of at least 7 kg/granule. In yet another example, the core can have a crush strength of at least 9 kg/granule. In yet another example, the core can have a crush strength from 3 kg/granule to 15 kg/granule, such as a crush strength from 3 kg/granule to 9 kg/granule.

In one aspect, the fertilizer capsule does not comprise calcium cyanamide.

In one aspect, the fertilizer additive is dispersed throughout the core. In another aspect, the fertilizer additive is dispersed homogeneously throughout the core.

The fertilizer composition has advantageous properties as compared to conventional fertilizer. For example, the fertilizer composition can comprise materials that serve different purposes. As such, only one application of the fertilizer composition is needed to serve multiple benefits, in contrast, several conventional fertilizers have to be applied to achieve the same benefit as the fertilizer compositions disclosed herein.

1. Binder

A binder is a material that is used to bind together components in a mixture through adhesive and cohesive forces.

In one aspect, the binder is an extrudable binder.

The core comprises from 10 wt % to 99 wt % of the binder. The binder is selected to so that an extrusion process can be used during the production of the core. It is understood that for some binders, such as Plaster of Paris (PoP) and bleached wheat flour, an amount of water (moisture) is needed to make the core extrudable. Any moisture present in the core material during the extrusion process is typically removed post-extrusion. However, residual amounts of moisture, typically below 4 wt %, such as, for example, below 0.5 wt %, can be present in the core. For other binders, such as waxes, no water is needed to make the core extrudable.

In one aspect, the core comprises from 20 wt % to 99 wt % of the binder. In another aspect, the core comprises from 30 wt % to 99 wt % of the binder. In yet another aspect, the core comprises from 40 wt % to 99 wt % of the binder. In yet another aspect, the core comprises from 50 wt % to 99 wt % of the binder. In yet another aspect, the core comprises from 60 wt % to 99 wt % of the binder. In yet another aspect, the core comprises from 70 wt % to 99 wt % of the binder. In yet another aspect, the core comprises from 80 wt % to 99 wt % of the binder. In yet another aspect, the core comprises from 90 wt % to 99 wt % of the binder. In yet another aspect, the core comprises from 60 wt % to 95 wt % of the binder.

In one aspect, the core comprises from 10 wt % to 90 wt % of the binder. In one aspect, the core comprises from 20 wt % to 90 wt % of the binder. In another aspect, the core comprises from 30 wt % to 90 wt % of the binder. In yet another aspect, the core comprises from 40 wt % to 90 wt % of the binder. In yet another aspect, the core comprises from 50 wt % to 90 wt % of the binder. In yet another aspect, the core comprises from 60 wt % to 90 wt % of the binder. In yet another aspect, the core comprises from 70 wt % to 90 wt % of the binder. In yet another aspect, the core comprises from 80 wt % to 90 wt % of the binder.

In one aspect, the core comprises from 10 wt % to 85 wt % of the binder. In one aspect, the core comprises from 20 wt % to 85 wt % of the binder. In another aspect, the core comprises from 30 wt % to 85 wt % of the binder. In yet another aspect, the core comprises from 40 wt % to 85 wt % of the binder. In yet another aspect, the core comprises from 50 wt % to 85 wt % of the binder. In yet another aspect, the core comprises from 60 wt % to 85 wt % of the binder. In yet another aspect, the core comprises from 75 wt % to 85 wt % of the binder. In yet another aspect, the core comprises from 70 wt % to 85 wt % of the binder.

In one aspect, the core comprises from 10 wt % to 80 wt % of the binder. In one aspect, the core comprises from 20 wt % to 80 wt % of the binder. In another aspect, the core comprises from 30 wt % to 80 wt % of the binder. In yet another aspect, the core comprises from 40 wt % to 80 wt % of the binder. In yet another aspect, the core comprises from 50 wt % to 80 wt % of the binder. In yet another aspect, the core comprises from 60 wt % to 80 wt % of the binder. In yet another aspect, the core comprises from 70 wt % to 80 wt % of the binder.

In one aspect, the core comprises from 10 wt % to 75 wt % of the binder. In one aspect, the core comprises from 20 wt % to 75 wt % of the binder. In another aspect, the core comprises from 30 wt % to 75 wt % of the binder. In yet another aspect, the core comprises from 40 wt % to 75 wt % of the binder. In yet another aspect, the core comprises from 50 wt % to 75 wt % of the binder. In yet another aspect, the core comprises from 60 wt % to 75 wt % of the binder.

In one aspect, the core comprises from 10 wt % to 70 wt % of the binder. In one aspect, the core comprises from 20 wt % to 70 wt % of the binder. In another aspect, the core comprises from 30 wt % to 70 wt % of the binder. In yet another aspect, the core comprises from 40 wt % to 70 wt % of the binder. In yet another aspect, the core comprises from 50 wt % to 70 wt % of the binder. In yet another aspect, the core comprises from 60 wt % to 70 wt % of the binder.

In one aspect, the core comprises from 10 wt % to 65 wt % of the binder. In one aspect, the core comprises from 20 wt % to 65 wt % of the binder. In another aspect, the core comprises from 30 wt % to 65 wt % of the binder. In yet another aspect, the core comprises from 40 wt % to 65 wt % of the binder. In yet another aspect, the core comprises from 50 wt % to 65 wt % of the binder.

In one aspect, the core comprises from 10 wt % to 60 wt % of the binder. In one aspect, the core comprises from 20 wt % to 60 wt % of the binder. In another aspect, the core comprises from 30 wt % to 60 wt % of the binder. In yet another aspect, the core comprises from 40 wt % to 60 wt % of the binder. In yet another aspect, the core comprises from 50 wt % to 60 wt % of the binder.

In one aspect, the core comprises about 10 wt %, 11 wt % 12 wt %, 13 wt %, 14 wt %, 15 wt %, 16 wt %, 17, wt %, 18 wt %, 19 wt %, 20 wt %, 21 wt %22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, 41 wt %42 wt %, 43 wt %, 44 wt %, 45 wt %, 46 wt %, 47, wt %, 48 wt %, 49 wt %, 50 wt %, 51 wt % 52 wt %, 53 wt %, 54 wt %, 55 wt %, 56 wt %, 57, wt %, 58 wt %, 59 wt %, 60 wt %, 61 wt %62 wt %, 63 wt %, 64 wt %, 65 wt %, 66 wt %, 67, wt %, 68 wt %, 69 wt %, 70 wt %, 71 wt %72 wt %, 73 wt %, 74 wt %, 75 wt %, 76 wt %, 77, wt %, 78 wt %, 79 wt %, 80 wt %, 81 wt % 82 wt %, 83 wt %, 84 wt %, 85 wt %, 86 wt %, 87, wt %, 88 wt %, 89 wt %, 90 wt %, 91 wt %92 wt %, 93 wt %, 94 wt %, 95 wt %, 96 wt %, 97, wt %, 98 wt %, or 99 wt % of the binder.

In one aspect the binder comprises a phosphate, a polyphosphate, a biodegradable polymer, or a wax, or a combination thereof. For example, the binder can comprise a wax. Suitable waxes include, but are not limited to, vegetable waxes, high melt waxes, ethylene bis(stearamide) wax, paraffin waxes, polyethylene based waxes, and olefin waxes. In another example, the binder can comprise a phosphate. Suitable phosphates include, but are not limited to, diammonium phosphate, and monoammonium phosphate. In yet another example, the binder can comprise a polyphosphate. Suitable polyphosphates include, but are not limited to, ammonium polyphosphate. In yet another example, the binder can comprise a biodegradable polymer. Suitable biodegradable polymers include, but are not limited to, polyacrylamide, polyacrylic acid, polyacrylonitrile; biodegradable polylactic acid and other biodegradable polymeric material such as polylactic acid, poly(3-hydroxypropionic acid), polyvinyl alcohol, poly e-caprolactone, poly L-lactide, poly butylene succinate and biodegradable starch based polymers.

In another aspect, the binder comprises polymers of, copolymers of, or blends of ethylene, propylene, acrylamide, acrylic acid, acrylonitrile, lactic acid, 3-hydroxy propionic acid, vinyl alcohol, lactide, or butylene succinate, or a combination thereof. For example, the binder can comprise polymers of ethylene, propylene, acrylamide, acrylic acid, acrylonitrile, lactic acid, 3-hydroxy propionic acid, vinyl alcohol, lactide, or butylene succinate, or a combination thereof, such as, for example, homopolymers of ethylene, propylene, acrylamide, acrylic acid, acrylonitrile, lactic acid, 3-hydroxy propionic acid, vinyl alcohol, lactide, or butylene succinate. In another example, the binder can comprise a blend of polymers of ethylene, propylene, acrylamide, acrylic acid, acrylonitrile, lactic acid, 3-hydroxy propionic acid, vinyl alcohol, lactide, or butylene succinate, or a combination thereof, such as for example, a blend of homopolymers of ethylene, propylene, acrylamide, acrylic acid, acrylonitrile, lactic acid, 3-hydroxy propionic acid, vinyl alcohol, lactide, or butylene succinate. In another example, the binder can comprise co-polymers of ethylene, propylene, acrylamide, acrylic acid, acrylonitrile, lactic acid, 3-hydroxy propionic acid, vinyl alcohol, lactide, or butylene succinate, or a combination thereof.

In another aspect, the binder comprises Plaster of Paris, flour, starch, or gluten, or combination thereof. For example, the binder can comprise Plaster of Paris. In another example, the binder can comprise flour. Suitable flours include, but are not limited to, rice flour, wheat flour, and bleached wheat flour. In yet another example, the binder can comprise starch. Suitable starches include, but are not limited to, dextrin modified starches. In yet another example, the binder can comprise gluten. In yet another example, the binder can comprise Plaster of Paris and flour comprising bleached wheat flour.

In one aspect, the core comprises from about 30 wt % to about 50 wt % of Plaster of Paris. For example, the core can comprise from about 34 wt % to about 48 wt % of Plaster of Paris. In one aspect, the core comprises about 30 wt %, 31 wt % 32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of Plaster of Paris.

In one aspect, the core comprises from about 20 wt % to about 40 wt % of bleached wheat flour. For example, the core can comprise from about 23 wt % to about 32 wt % of bleached wheat flour. In one aspect, the core comprises about 20 wt %, 21 wt % 22 wt %, 23 wt %, 24 wt %, 25 wt %, 26 wt %, 27, wt %, 28 wt %, 29 wt %, 30 wt %, 31 wt % 32 wt %, 33 wt %, 34 wt %, 35 wt %, 36 wt %, 37, wt %, 38 wt %, 39 wt %, 40 wt %, of bleached wheat flour.

In one aspect, the core comprises from 30 wt % to 50 wt % of Plaster of Paris and from 20 wt % to 40 wt % of flour comprising bleached wheat flour. For example, the core can comprise from about 34 wt % to about 48 wt % of Plaster of Paris and from about 23 wt % to about 32 wt % of bleached wheat flour.

2. Inhibitor

The core can comprise an inhibitor. The inhibitor is a urease and/or nitrification inhibitor. Such inhibitors are known to one skilled in the art.

In one aspect, the core can comprise one or more inhibitors. The inhibitor can be a urease inhibitor or a nitrification inhibitor, or a combination thereof. In one aspect, the core can comprise a urease inhibitor and a nitrification inhibitor. In one aspect, the inhibitor can be a urease inhibitor. Suitable urease inhibitors include, but are not limited to, NBTPT and PPDA. In one aspect, urease inhibitor can comprise NBTPT or PPDA, or a combination thereof. For example, the urease inhibitor can be selected from the group consisting of NBTPT and PPDA, or a combination thereof. In another aspect, the inhibitor can be a nitrification inhibitor. Suitable nitrification inhibitors include, but are not limited to, DMPP, DCD, TU, Nitrapyrin, Terrazole, AM, MBT and ST. In one aspect, the core can comprise a urease inhibitor and a nitrification inhibitor. In one aspect, nitrification inhibitor can comprise DMPP, DCD, TU, Nitrapyrin, Terrazole, AM, MBT or ST, or a combination thereof. For example, the nitrification inhibitor can be selected form the group consisting of DMPP, DCD, TU, Nitrapyrin, Terrazole, AM, MBT and ST, or a combination thereof. In one aspect, the inhibitor can comprise NBTPT, DMPP, TU, DCD, PPDA, Nitrapyrin, Terrazole, AM, MBT, or ST or a combination thereof. For example, the inhibitor can comprise NBTPT. In another example, the inhibitor can comprise DMPP. In yet another example, the inhibitor can comprise TU. In yet another example, the inhibitor can comprise DCD. In yet another example, the inhibitor can comprise PPDA. In yet another example, the inhibitor can comprise Nitrapyrin. In yet another example, the inhibitor can comprise Terrazole. In yet another example, the inhibitor can comprise AM. In yet another example, the inhibitor can comprise MBT. In yet another example, the inhibitor can comprise ST. In yet another example, the inhibitor can comprise any combination of NBTPT, DMPP, TU, DCD, PPDA, Nitrapyrin, Terrazole, AM, MBT, and ST. For example, the inhibitor can comprise NBTPT and DCD. In yet another example, the inhibitor can comprise PPDA and DCD. In yet another example, the inhibitor can comprise NBTPT and DMPP. In some of the instances where the core comprises at least one of a urease inhibitor and a nitrification inhibitors, the urease inhibitors are selected from the group consisting of N-(n-butyl) thiophosphoric triamide (NBTPT), phenyl phosphorodiamidate (PPDA), and combinations thereof, and the nitrification inhibitor is selected from the group consisting of 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1,2,4-thiadiazol (Terrazole), 2-Amino-4-chloro-6-methyl-pyrimidine (AM), 2-Mercapto-benzothiazole (MBT), 2-Sulfanimalamidothiazole (ST), and combinations thereof.

In one aspect, the core comprises from greater than 0 wt % to 80 wt % of the inhibitor. In another aspect, the core comprises from 10 wt % to 80 wt % of the inhibitor. In another aspect, the core comprises from 15 wt % to 80 wt % of the inhibitor. In yet another aspect, the core comprises from 10 wt % to 50 wt % of the inhibitor. In yet another aspect, the core comprises from 15 wt % to 50 wt % of the inhibitor. In yet another aspect, the core comprises from 15 wt % to 45 wt % of the inhibitor. In one aspect, the core comprises from greater than 0 wt % to 54 wt % of the inhibitor. In another aspect, the core comprises from greater than 0 wt % to 45 wt % of the inhibitor. In yet another aspect, the core comprises from greater than 0 wt % to 35 wt % of the inhibitor. In yet another aspect, the core comprises from greater than 0 wt % to 30 wt % of the inhibitor. In yet another aspect, the core comprises from greater than 0 wt % to 25 wt % of the inhibitor. In yet another aspect, the core comprises from greater than 0 wt % to 20 wt % of the inhibitor. In yet another aspect, the core comprises from 10 wt % to 35 wt % of the inhibitor. In yet another aspect, the core comprises from 10 wt % to 30 wt % of the inhibitor.

In one aspect, the core comprises from greater than 0 wt % to 20 wt % of a urease inhibitor. In another aspect, the core comprises from greater than 0 wt % to 15 wt % of a urease inhibitor. In another aspect, the core comprises from greater than 0 wt % to 10 wt % of a urease inhibitor. In yet another aspect, the core comprises from greater than 0 wt % to 5 wt % of a urease inhibitor. In yet another aspect, the core comprises from greater than 0 wt % to 3 wt % of a urease inhibitor. In yet another aspect, the core comprises from greater than 0 wt % to 2 wt % of a urease inhibitor. In yet another aspect, the core comprises from 1 wt % to 2 wt % of a urease inhibitor. In one aspect, the core comprises about 0.5 wt %, 1 wt %, 2 wt %, 3 wt %, 4 wt %, 5 wt %, 6 wt %, 7 wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt % of a urease inhibitor.

In one aspect, the core comprises from greater than 0 wt % to 20 wt % of NBTPT. In another aspect, the core comprises from greater than 0 wt % to 15 wt % of NBTPT. In another aspect, the core comprises from greater than 0 wt % to 10 wt % of NBTPT. In yet another aspect, the core comprises from greater than 0 wt % to 5 wt % of NBTPT. In yet another aspect, the core comprises from greater than 0 wt % to 3 wt % of NBTPT. In yet another aspect, the core comprises from greater than 0 wt % to 2 wt % of NBTPT. In yet another aspect, the core comprises from 1 wt % to 2 wt % of NBTPT. In one aspect, the core comprises about 0.5 wt %, 1 wt %, 2 wt %, 3 wt %, 4 wt %, 5 wt %, 6 wt %, 7 wt %, 8 wt %, 9 wt %, 10 wt %, 11 wt % 12 wt %, 13 wt %, 14 wt %, 15 wt %, 16 wt %, 17, wt %, 18 wt %, 19 wt %, 20 wt % of NBTPT.

In one aspect, the core comprises from 10 wt % to 50 wt % of a nitrification inhibitor. In another aspect, the core comprises from 15 wt % to 45 wt % of a nitrification inhibitor. In another aspect, the core comprises from 18 wt % to 42 wt % of a nitrification inhibitor. In yet another aspect, the core comprises from 30 wt % to 50 wt % of a nitrification inhibitor. In yet another aspect, the core comprises from 35 wt % to 45 wt % of a nitrification inhibitor. In yet another aspect, the core comprises from 10 wt % to 30 wt % of a nitrification inhibitor. In yet another aspect, the core comprises from 15 wt % to 25 wt % of a nitrification inhibitor. In one aspect, the core comprises about 10 wt %, 11 wt % 12 wt %, 13 wt %, 14 wt %, 15 wt %, 16 wt %, 17, wt %, 18 wt %, 19 wt %, 20 wt %, 21 wt %22 wt %, 23 wt %, 24 wt %, 25 wt %, 26 wt %, 27, wt %, 28 wt %, 29 wt %, 30 wt %, 31 wt %32 wt %, 33 wt %, 34 wt %, 35 wt %, 36 wt %, 37, wt %, 38 wt %, 39 wt %, 40 wt %, 41 wt %42 wt %, 43 wt %, 44 wt %, 45 wt %, 46 wt %, 47, wt %, 48 wt %, 49 wt %, 50 wt % of a nitrification inhibitor.

In one aspect, the core comprises from 10 wt % to 50 wt % of DCD. In another aspect, the core comprises from 15 wt % to 45 wt % of DCD. In another aspect, the core comprises from 18 wt % to 42 wt % of DCD. In yet another aspect, the core comprises from 30 wt % to 50 wt % of DCD. In yet another aspect, the core comprises from 35 wt % to 45 wt % of DCD. In yet another aspect, the core comprises from 10 wt % to 30 wt % of DCD. In yet another aspect, the core comprises from 15 wt % to 25 wt % of DCD. In one aspect, the core comprises about 10 wt %, 11 wt % 12 wt %, 13 wt %, 14 wt %, 15 wt %, 16 wt %, 17, wt %, 18 wt %, 19 wt %, 20 wt %, 21 wt %22 wt %, 23 wt %, 24 wt %, 25 wt %, 26 wt %, 27, wt %, 28 wt %, 29 wt %, 30 wt %, 31 wt %32 wt %, 33 wt %, 34 wt %, 35 wt %, 36 wt %, 37, wt %, 38 wt %, 39 wt %, 40 wt %, 41 wt % 42 wt %, 43 wt %, 44 wt %, 45 wt %, 46 wt %, 47, wt %, 48 wt %, 49 wt %, 50 wt % of DCD.

In one aspect, the core comprises from greater than 0 wt % to 20 wt % of a urease inhibitor and from 10 wt % to 50 wt % of a nitrification inhibitor. In another aspect, the core comprises from greater than 0 wt % to 5 wt % of a urease inhibitor and from 10 wt % to 30 wt % of a nitrification inhibitor. In another aspect, the core comprises from greater than 0 wt % to 5 wt % of a urease inhibitor and from 30 wt % to 50 wt % of a nitrification inhibitor. In yet another aspect, the core comprises from greater than 0 wt % to 2 wt % of a urease inhibitor and from 35 wt % to 45 wt % of a nitrification inhibitor. In yet another aspect, the core comprises from greater than 0 wt % to 2 wt % of a urease inhibitor and from 15 wt % to 25 wt % of a nitrification inhibitor.

In one aspect, the core comprises from greater than 0 wt % to 20 wt % of NBTPT and from 10 wt % to 50 wt % of DCD. In another aspect, the core comprises from greater than 0 wt % to 5 wt % of NBTPT and from 10 wt % to 30 wt % of DCD. In another aspect, the core comprises from greater than 0 wt % to 5 wt % of NBTPT and from 30 wt % to 50 wt % of DCD. In yet another aspect, the core comprises from greater than 0 wt % to 2 wt % of NBTPT and from 35 wt % to 45 wt % of DCD. In yet another aspect, the core comprises from greater than 0 wt % to 2 wt % of NBTPT and from 15 wt % to 25 wt % of DCD.

In one aspect, the core comprises from 20 wt % to 90 wt % of the binder and from 80 wt % to 10 wt % of the inhibitor. In another aspect, the core comprises from 50 wt % to 90 wt % of the binder and from 50 wt % to 10 wt % of the inhibitor. In yet another aspect, the core comprises from 30 wt % to 85% of the binder and from 70 wt % to 15 wt % of the inhibitor.

In one aspect, the core comprises from 30 wt % to 50 wt % of Plaster of Paris, from 20 wt % to 40 wt % of flour comprising bleached wheat flour, from 10 wt % to 50 wt % of a nitrification inhibitor, and from more than 0 wt % to 5 wt % of a urease inhibitor. In yet another aspect, the core comprises from 20 wt % to 40 wt % of Plaster of Paris, from 10 wt % to 30 wt % of flour comprising bleached wheat flour, from 30 wt % to 50 wt % of a urease inhibitor, and from more than 0 wt % wt to 5 wt % of a nitrification inhibitor.

In one aspect, the core comprises from 30 wt % to 50 wt % of Plaster of Paris, from 20 wt % to 40 wt % of flour comprising bleached wheat flour, from 10 wt % to 50 wt % of DCD, and from more than 0 wt % to 5 wt % of NBTPT. In yet another aspect, the core comprises from 20 wt % to 40 wt % of Plaster of Paris, from 10 wt % to 30 wt % of flour comprising bleached wheat flour, from 30 wt % to 50 wt % of DCD, and from more than 0 wt % wt to 5 wt % of NBTPT.

In one aspect, the core comprises from 30 wt % to 50 wt % of Plaster of Paris, from 20 wt % to 40 wt % of flour comprising bleached wheat flour, from 10 wt % to 50 wt % of DCD, and from more than 0 wt % to 5 wt % of NBTPT, and wherein a shell substantially comprising urea surrounds or partially surrounds the core. In yet another aspect, the core comprises from 20 wt % to 40 wt % of Plaster of Paris, from 10 wt % to 30 wt % of flour comprising bleached wheat flour, from 30 wt % to 50 wt % of DCD, and from more than 0 wt % wt to 5 wt % of NBTPT, and wherein a shell substantially comprising urea surrounds or partially surrounds the core.

3. Micronutrient

The core can comprise a micronutrient. A micronutrient is a botanically acceptable form of an inorganic or organometallic compound comprising boron (B), copper (Cu), iron (Fe), chloride (Cl), manganese (Mn), molybdenum (Mo), Nickel (Ni), or zinc (Zn), or a combination thereof. A micronutrient provide amounts of B, Cu, Fe, Cl, Mn, Mo, Ni, or Zn, or a combination thereof to promote the growth and development of plants, such as crops. For example, the core can comprise B. In another example, the core can comprise Cu. In yet another example, the core can comprise Fe. In yet another example, the core can comprise Cl. In yet another example, the core can comprise Mn. In yet another example, the core can comprise Mo. In yet another example, the core can comprise Zn. In yet another example, the core can comprise any combination of B, Cu, Fe, Cl, Mn, Mo, Ni, or Zn, or a combination thereof. In yet another example, the core can comprise any combination of B, Cu, Fe, Cl, Mn, Mo, or Zn, or a combination thereof. For example the core can comprise of B and Zn.

In one aspect, the micronutrient is an inorganic compound comprising B, Cu, Fe, Cl, Mn, Mo, Ni, or Zn, or a combination thereof. In one aspect, the micronutrient is an inorganic compound comprising B, Cu, Fe, Cl, Mn, Mo, or Zn, or a combination thereof. Suitable inorganic compounds include, but are not limited to, sulfates oxides and salts. Specific examples include Borax, $CuSO_4$, $FeSO_4$, and $ZnSO_4$.

In another aspect, the micronutrient is an organic compound comprising B, Cu, Fe, Cl, Mn, Mo, Ni, or Zn, or a combination thereof. Suitable organic compounds include, but are not limited to, to Fe EDTA, Fe EDDHA, Ca EDTA, Zn EDTA, and Mn EDTA where EDTA is ethylenediaminetetraacetate and EDDHA is ethylenediamine-N,N'-bis(2-hydroxyphenylacetate).

The micronutrient, in some cases, is boron. In these instances, boron can be included in the core, shell or both core and the shell. In some particular aspects, the boron is included in shell, with urea and other ingredients. It can also be included in a separate layer, over or under the urea shell. In some other aspects, the boron is included in the core. It can be included as in any form known in the skill of art, for example, as separate granules, or as a mixture with the other ingredients. For the ease of processing, it is convenient to include the micronutrient (e.g., boron) as a mixture with other ingredients. However, practical problems may arise due to adverse interactions with the other ingredients. In these cases, the boron can be included as separate granules.

As the elemental boron cannot be used as a micronutrient, any of forms known in the skill or art can be used. Generally, boron is used as the boric acid or borates (borax) or derivatives thereof. In some particular aspects, the fertilizer capsule includes borates in the core. As discussed above, borates can be included in the shell as well. The exemplary borate compounds include anhydrous sodium tetraborate ($Na_2B_4O_7$), sodium tetraborate pentahydrate ($Na_2B_4O_7.5H_2O$), sodium tetraborate decahydrate ($Na_2B_4O_7.10H_2O$), potassium metaborates, potassium tetraborates, potassium peroxyborates, calcium metaborates, ammonium pentaborates, ammonium tetraborates or derivatives thereof.

In one aspect, the core comprises from greater than 0 wt % to 50 wt % of the micronutrient on an atom basis. In another aspect, the core comprises from greater than 0 wt % to 40 wt % of the micronutrient on an atom basis. In yet another aspect, the core comprises from greater than 0 wt % to 30 wt % of the micronutrient on an atom basis. In yet another aspect, the core comprises from greater than 0 wt % to 20 wt % of the micronutrient on an atom basis. In yet another aspect, the core comprises from greater than 0 wt % to 10 wt % of the micronutrient on an atom basis. In yet another aspect, the core comprises from greater than 10 wt % to 50 wt % of the micronutrient on an atom basis. In yet another aspect, the core comprises from 20 wt % to 50 wt % of the micronutrient on an atom basis. In yet another aspect, the core comprises from 30 wt % to 50 wt % of the micronutrient on an atom basis The term "on an atom basis" refers to the weight of the micronutrient as determined based on an atom to atom calculation. For example, for a core weighing 100 g, 10% on an atom basis of Fe or 10 g Fe. Thus, Fe can be incorporated into the core as $FeSO_4$, thus, (10 g×152/56)=27 g of $FeSO_4$ has to be added to get 10 g (or 10%) of Fe in the core.

4. Primary Nutrient

A primary nutrient is a material that can deliver nitrogen (N), phosphorus (P), and/or potassium (K) to a plant. For example, the primary nutrient can be a material that can deliver nitrogen to a plant. In another example, the primary nutrient can be a material that can deliver phosphorus to a plant. In another example, the primary nutrient can be a material that can deliver potassium to a plant.

In one aspect, the primary nutrient is a material that comprises urea, ammonium nitrate, ammonium sulfate, diammonium phosphate, monoammonium phosphate, or urea-formaldehyde, or a combination thereof. For example, the primary nutrient can be a material that comprises urea. In another example, the primary nutrient can be a material that comprises ammonium nitrate. In yet another example, the primary nutrient can be a material that comprises ammonium nitrate. In yet another example, the primary nutrient can be a material that comprises ammonium sulfate. In yet another example, the primary nutrient can be a material that comprises diammonium phosphate. In yet another example, the primary nutrient can be a material that comprises monoammonium phosphate. In yet another example, the primary nutrient can be a material that comprises urea-formaldehyde.

The primary nutrient can be mixed with the binder, such as the extrudable binder, prior extrusion.

In one aspect, the core comprises from greater than 0 wt % to 80 wt % of the primary nutrient. In another aspect, the core comprises from 10 wt % to 80 wt % of the primary nutrient. In another aspect, the core comprises from 15 wt % to 80 wt % of the primary nutrient. In yet another aspect, the core comprises from 10 wt % to 50 wt % of the primary nutrient. In yet another aspect, the core comprises from 15 wt % to 50 wt % of the primary nutrient. In yet another aspect, the core comprises from 15 wt % to 45 wt % of the primary nutrient. In one aspect, the core comprises from greater than 0 wt % to 54 wt % of the primary nutrient. In another aspect, the core comprises from greater than 0 wt % to 45 wt % of the primary nutrient. In yet another aspect, the core comprises from greater than 0 wt % to 35 wt % of the primary nutrient. In yet another aspect, the core comprises from greater than 0 wt % to 30 wt % of the primary nutrient. In yet another aspect, the core comprises from greater than 0 wt % to 25 wt % of the primary nutrient. In yet another aspect, the core comprises from greater than 0 wt % to 20 wt % of the primary nutrient. In yet another aspect, the core comprises from 10 wt % to 35 wt % of the primary nutrient. In yet another aspect, the core comprises from 10 wt % to 30 wt % of the primary nutrient.

In one aspect, the core comprises from 20 wt % to 90 wt % of the binder and from 80 wt % to 10 wt % of the primary nutrient. In another aspect, the core comprises from 50 wt % to 90 wt % of the binder and from 5 wt 0% to 10 wt % of the primary nutrient. In yet another aspect, the core comprises from 30 wt % to 85 wt % of the binder and from 70% wt % to 15 wt % of the primary nutrient.

Fertilizers with urea-formaldehyde from various sources are described in U.S. Pat. Nos. 8,419,819; 6,936,681; 6,900,162; 6,936,573; 7,213,367; and 6,048,378, which are all hereby incorporated by reference for their disclosure of fertilizers with urea-formaldehyde.

5. Secondary Nutrient

A secondary nutrient is a material that can deliver calcium (Ca), magnesium (Mg), and/or sulfur (S) to a plant. For example, the secondary nutrient can be a material that can deliver calcium to a plant. In another example, the secondary nutrient can be a material that can deliver magnesium to a plant. In another example, the secondary nutrient can be a material that can deliver sulfur to a plant.

In one aspect, the secondary nutrient can comprise Ca or Mg or a combination thereof.

In one aspect, the sulfur can be elemental sulfur.

Fertilizers with urea-formaldehyde from various sources are described in U.S. Pat. No. 6,749,659 and Published U.S. Application 2004/0163434, which are both hereby incorporated by reference for their disclosure of fertilizers with sulfur.

In one aspect, the secondary nutrient comprises lime, gypsum or superphosphate, or a combination thereof. In another aspect, the secondary nutrient comprises calcium ammonium nitrate or calcium nitrate, or a combination thereof. In yet another aspect, the secondary nutrient comprises eggshells, bone meal, or limestone, or a combination thereof.

The secondary nutrient can be mixed with the binder, such as the extrudable binder, prior extrusion.

In one aspect, the core comprises from greater than 0 wt % to 80 wt % of the secondary nutrient. In another aspect, the core comprises from 10 wt % to 80 wt % of the secondary nutrient. In another aspect, the core comprises from 15 wt % to 80 wt % of the secondary nutrient. In yet another aspect, the core comprises from 10 wt % to 50 wt % of the secondary nutrient. In yet another aspect, the core comprises from 15 wt % to 50 wt % of the secondary nutrient. In yet another aspect, the core comprises from 15 wt % to 45 wt % of the secondary nutrient. In one aspect, the core comprises from greater than 0 wt % to 54 wt % of the secondary nutrient. In another aspect, the core comprises from greater than 0 wt % to 45 wt % of the secondary nutrient. In yet another aspect, the core comprises from greater than 0 wt % to 35 wt % of the secondary nutrient. In yet another aspect, the core comprises from greater than 0 wt % to 30 wt % of the secondary nutrient. In yet another aspect, the core comprises from greater than 0 wt % to 25 wt % of the secondary nutrient. In yet another aspect, the core comprises from greater than 0 wt % to 20 wt % of the secondary nutrient. In yet another aspect, the core comprises from 10 wt % to 35 wt % of the secondary nutrient. In yet another aspect, the core comprises from 10 wt % to 30 wt % of the secondary nutrient.

In one aspect, the core comprises from 20 wt % to 90 wt % of the binder and from 80 wt % to 10 wt % of the secondary nutrient. In another aspect, the core comprises from 50 wt % to 90 wt % of the binder and from 50 wt % to 10 wt % of the secondary nutrient. In yet another aspect, the core comprises from 30 wt % to 85 wt % of the binder and from 70 wt % to 15 wt % of the secondary nutrient.

6. Filler

In some aspects, the core can comprise a filler. A filler is a material that can facilitate the release of inhibitors or micronutrients from the core. Accordingly, a filler is added to a matrix material with improve the properties of the core. A filler in combination with a binder can be selected to enhance physical and release properties of the core. For example, the good surface texture and good crush strength of the core can be achieved by using bleached wheat flour, as a binder, and colloidal silica, as a filler.

In one aspect, the filler comprises silica, colloidal silica, rice husk, dried distillers grains with solubles (DDGS), kaolin, bentonite, or other biomaterial, or a combination thereof. For example, the core can comprise silica. In another example, the core can comprise colloidal silica. In yet another example, the core can comprise rice husk. In yet another example, the core can comprise dried distillers grains with solubles (DDGS). In yet another example, the core can comprise kaolin. In yet another example, the core can comprise bentonite. In yet another example, the core can comprise other biomaterials, such as DDGS or rice husk. In yet another example, the core can comprise any combination of silica, colloidal silica, rice husk, dried distillers grains with solubles (DDGS), kaolin, bentonite, and other biomaterial.

In one aspect, the core comprises from greater than 0 wt % to 60 wt % of the filler. In another aspect, the core comprises from greater than 0 wt % to 50 wt % of the filler. In yet another aspect, the core comprises from greater than 0 wt % to 40 wt % of the filler. In yet another aspect, the core comprises from greater than 0 wt % to 30 wt % of the filler. In yet another aspect, the core comprises from greater than 0 wt % to 25 wt % of the filler. In yet another aspect, the core comprises from greater than 0 wt % to 20 wt % of the filler. In yet another aspect, the core comprises from 5 wt % to 40 wt % of the filler. In yet another aspect, the core comprises from 10 wt % to 30 wt % of the filler.

7. Shell

In one aspect, the fertilizer capsule further comprises a shell comprising urea or other nitrogen fertilizer or a combination thereof. For example, the fertilizer capsule can comprise urea. In another example, the fertilizer capsule can comprise other nitrogen fertilizer. In yet another example, the fertilizer capsule can comprise urea and other nitrogen fertilizer. Suitable other nitrogen fertilizers include, but are not limited to, ammonium nitrate, ammonium sulfate, DAP, MAP, urea-formaldehyde, ammonium chloride, and potassium nitrate.

The shell can be fattened onto the core by spraying molten urea onto the core in a granulation process.

In one aspect, the shell comprises from greater than 0 wt % to 100 wt % of the urea or other nitrogen fertilizer or a combination thereof. In another aspect, the shell comprises from greater than 0 wt % to 99 wt % of the urea or other nitrogen fertilizer or a combination thereof. In yet another aspect, the shell comprises from greater than 0 wt % to 90 wt % of the urea or other nitrogen fertilizer or a combination thereof. In yet another aspect, the shell comprises from greater than 0 wt % to 80 wt % of the urea or other nitrogen fertilizer or a combination thereof. In yet another aspect, the shell comprises from greater than 0 wt % to 60 wt % of the urea or other nitrogen fertilizer or a combination thereof. In yet another aspect, the shell comprises from greater than 60 wt % to 99 wt % of the urea or other nitrogen fertilizer or a combination thereof. In yet another aspect, the shell comprises from 80 wt % to 99 wt % of the urea or other nitrogen fertilizer or a combination thereof.

C. METHODS

Also disclosed herein, is a method preparing a fertilizer capsule core comprising the step of: a) extruding a mixture comprising one or more fertilizer additives and an extrudable binder, thereby forming a core.

Also disclosed herein, is a method for preparing a fertilizer capsule core comprising the step of: a) extruding a mixture comprising an inhibitor or a micronutrient or a combination thereof and a binder, thereby forming a core, wherein the inhibitor comprises NBTPT, DMPP, TU, DCD, PPDA, Nitrapyrin, Terrazole, AM, MBT, or ST or a combination thereof.

Also disclosed herein is a fertilizer capsule core produced from the methods disclosed herein.

In one aspect, the core can be a core described elsewhere herein.

In one aspect, the extruding comprises extruding from an extruder at a temperature from 0° C. to 140° C. and a screw speed from 1 to 500 rpm, wherein the extruder comprises a multi-feeder comprising extrusion components. Extrusion components include, but are not limited to, the main drive, shaft, screw, barrel, and die. In one example, the temperature can be from 20° C. to 120° C. In another example, the temperature can be from 20° C. to 100° C. In yet another example, the temperature can be from 20° C. to 80° C. In yet another example, the temperature can be from 20° C. to 60° C. In yet another example, the temperature can be from 60° C. to 120° C. In one example, the screw speed from 60 to 80 rpm. In another example, the screw speed from 70 to 90 rpm.

In one aspect, the method further comprises slicing the extrudate, thereby forming a core of cylindrical shape having a diameter and a length from 0.7 mm to 2.0 mm. For example, the core can have a size from 0.9 mm to 1.5 mm. In one aspect, the method further comprises spheronizing the core, thereby producing a core having a substantial spherical shape.

In one aspect, the method further comprises the step of fattening the core with a shell comprising urea or other nitrogen fertilizer, thereby forming a fertilizer capsule. The fattening process can comprise spraying molten urea or other nitrogen fertilizer onto the core. In one aspect, the fattening of the core process is a granulation process.

In one aspect, the fattening of the core with a shell produces a fertilizer capsule having a size from 1.5 mm to 8.0 mm, or from 2.0 mm to 4.0 mm.

In one aspect, the mixture comprises water. Water is added to the mixture if the binder is selected so that water is required to be added to make the mixture extrudable. For example, water can be added if the binder comprises Plaster of Paris, flour, starch, or gluten, or combination thereof. In another example, water can be added if the binder comprises Plaster of Paris, flour, starch, or gluten, or combination thereof and if the binder does not comprise a wax.

In one aspect, the mixture has a moisture content from greater than 0 wt % to 40 wt %. For example, the mixture can have a moisture content from 10 wt % to 40 wt %. In another aspect, the mixture can have a moisture content from 20 wt % to 40 wt %. In yet another aspect, the mixture can have a moisture content from 30 wt % to 40 wt %. In yet another aspect, the mixture can have a moisture content from greater than 0 wt % to 20 wt %.

In one aspect, the method further comprises heating the core, thereby drying the core. The heating can be done in a oven/dryer/similar instruments. Accordingly, the method can further comprise spheronizing the core in a spheronizer. The core can have a moisture content from greater than 0 wt % to 4 wt % after the core has been spheronized. In one aspect, the spheronizer can operate at temperatures between 50° C. and 200° C., such as, for example, between 80° C. and 150° C. In one aspect, the spheronizer can operate at temperatures between 5° C. and 95° C., such as, for example, between 20° C. and 25° C. Residence time will vary between 10 seconds to 30 minutes, such as, for example, between 15 seconds to 5 minutes or between 30 seconds to 5 minutes. RPM of spheronizer will be dependent on the size and manufacturer's instructions.

The fertilizers and methods disclosed herein have several advantages over conventional fertilizer materials and methods. For example, the disclosed fertilizer capsule compositions can prevent unwanted loss of a fertilizer additive, thereby lowering cost and/or improving the performance of the fertilizer.

Figure 4:
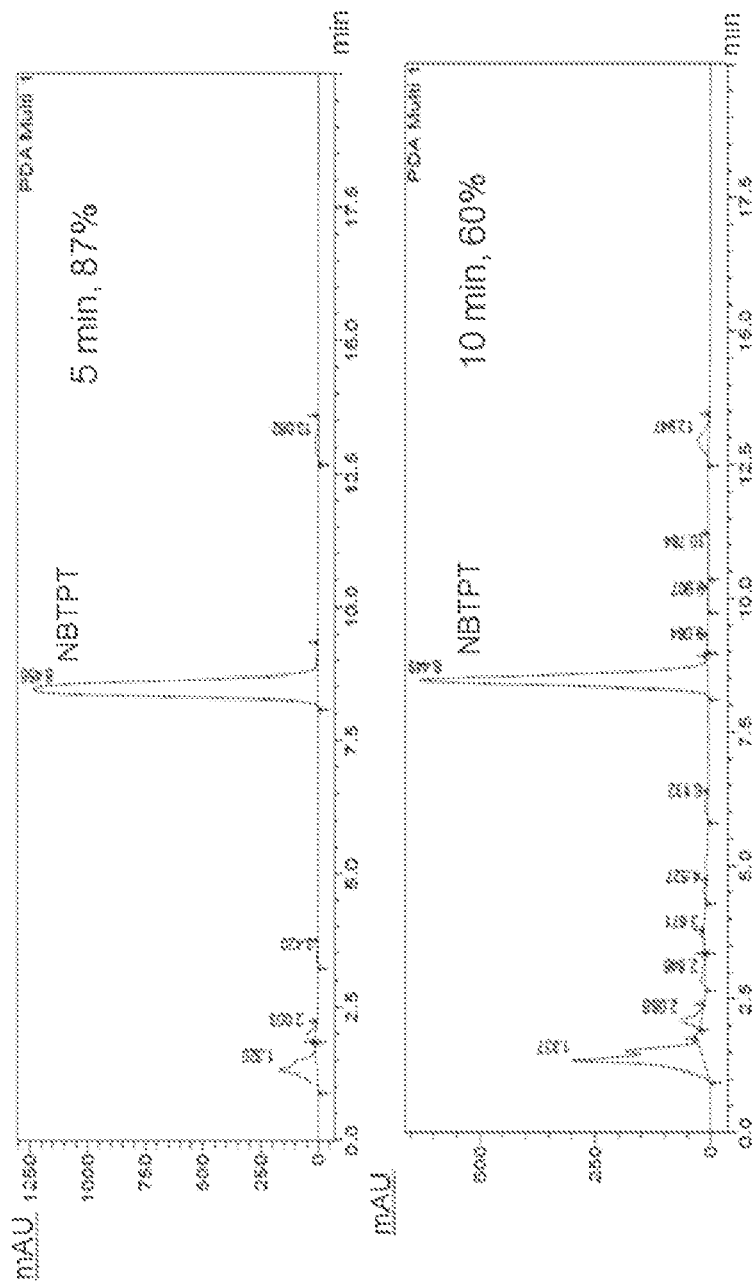
FIG. 4 shows the HPLC analysis of neat NBTPT that is exposed to 133-135° C. The percentage of intact NBTPT in the sample is shown in each chromatogram.
Figure 4:
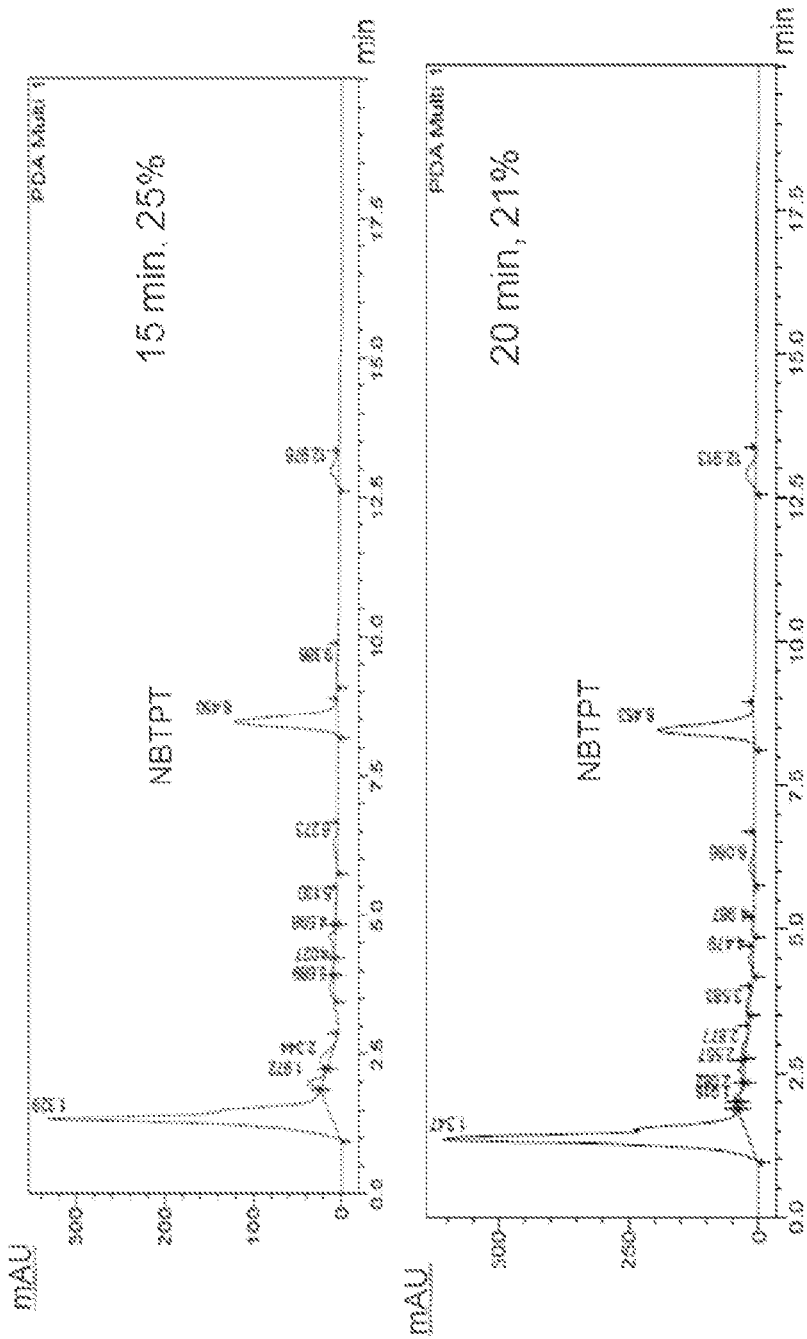
Figure 4:
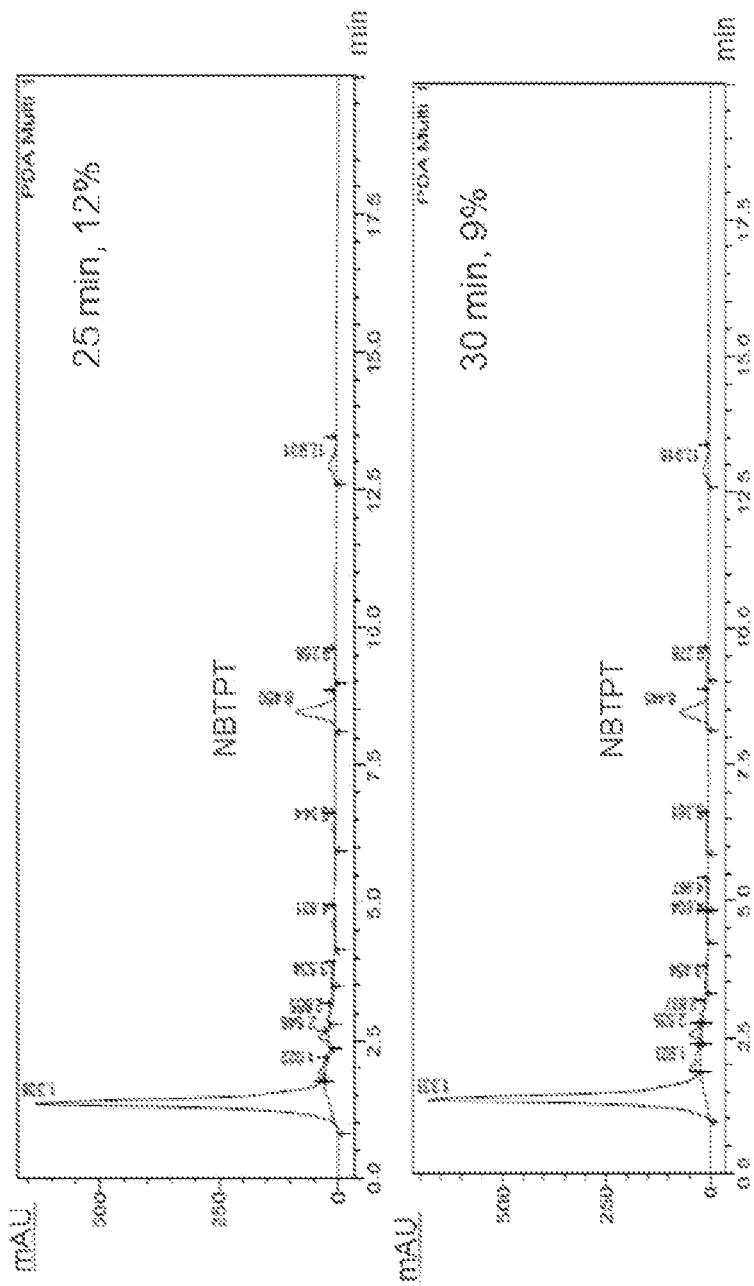

Certain fertilizer additives can be unstable and decompose at elevated temperatures. In a conventional manufacturing process, a fertilizer additive is directly exposed to the temperature of a urea melt, which is typically 133-135° C., during the granulation process. As shown in FIG. 4, in one example of this problem, neat NBTPT decomposes at this temperature over time. Accordingly, at least a portion of NBTPT is lost by using conventional methods.

Figure 5:
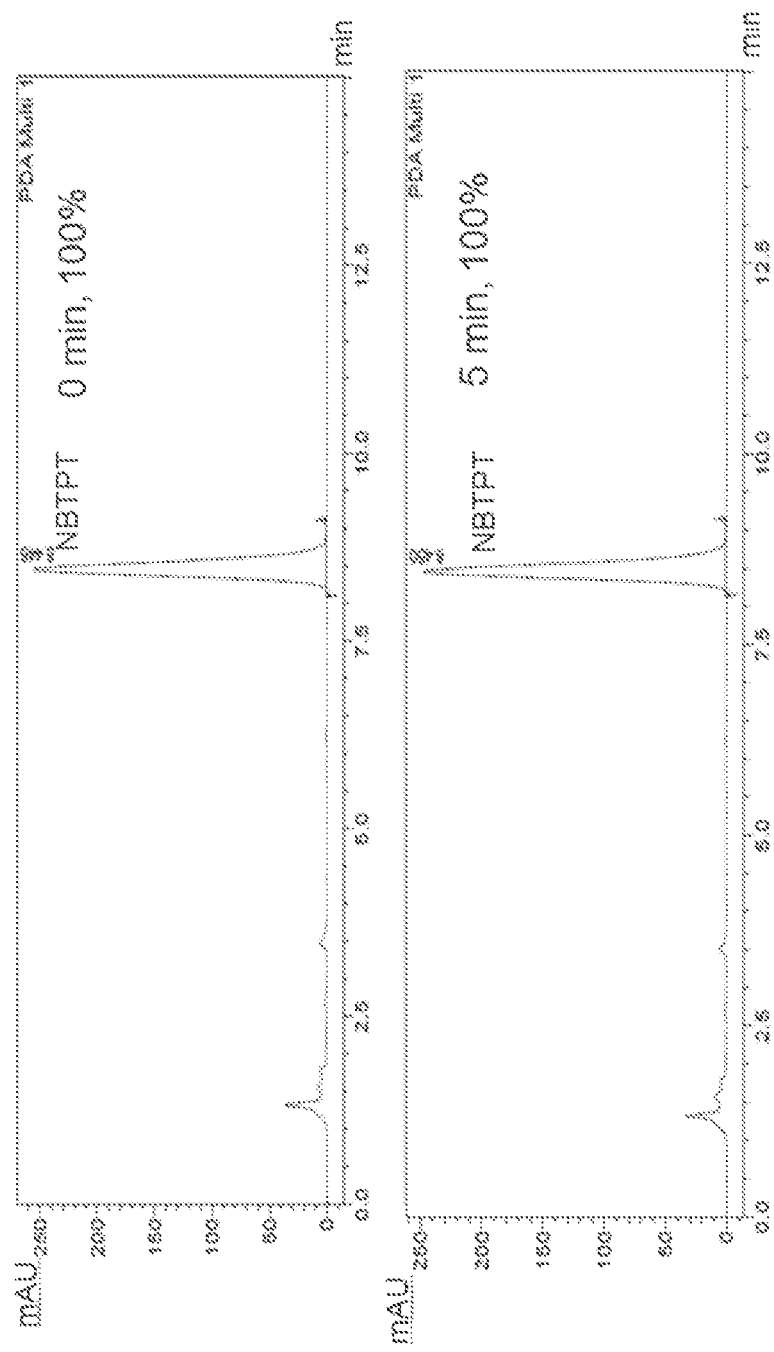
FIG. 5 shows data from the HPLC analysis of NBTPT within a core that is exposed to 133-135° C. The percentage of intact NBTPT in the sample is shown in each chromatogram.
Figure 5:
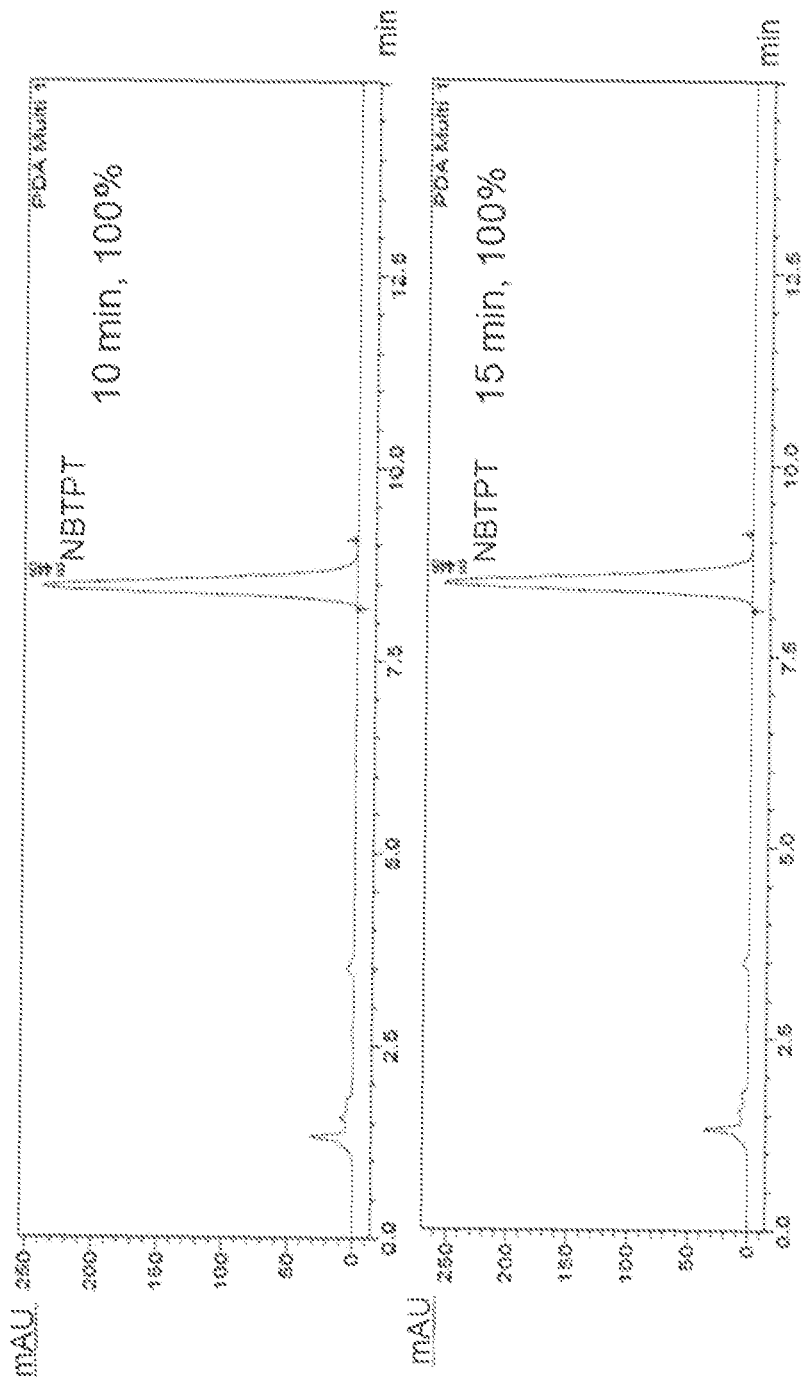
Figure 5:
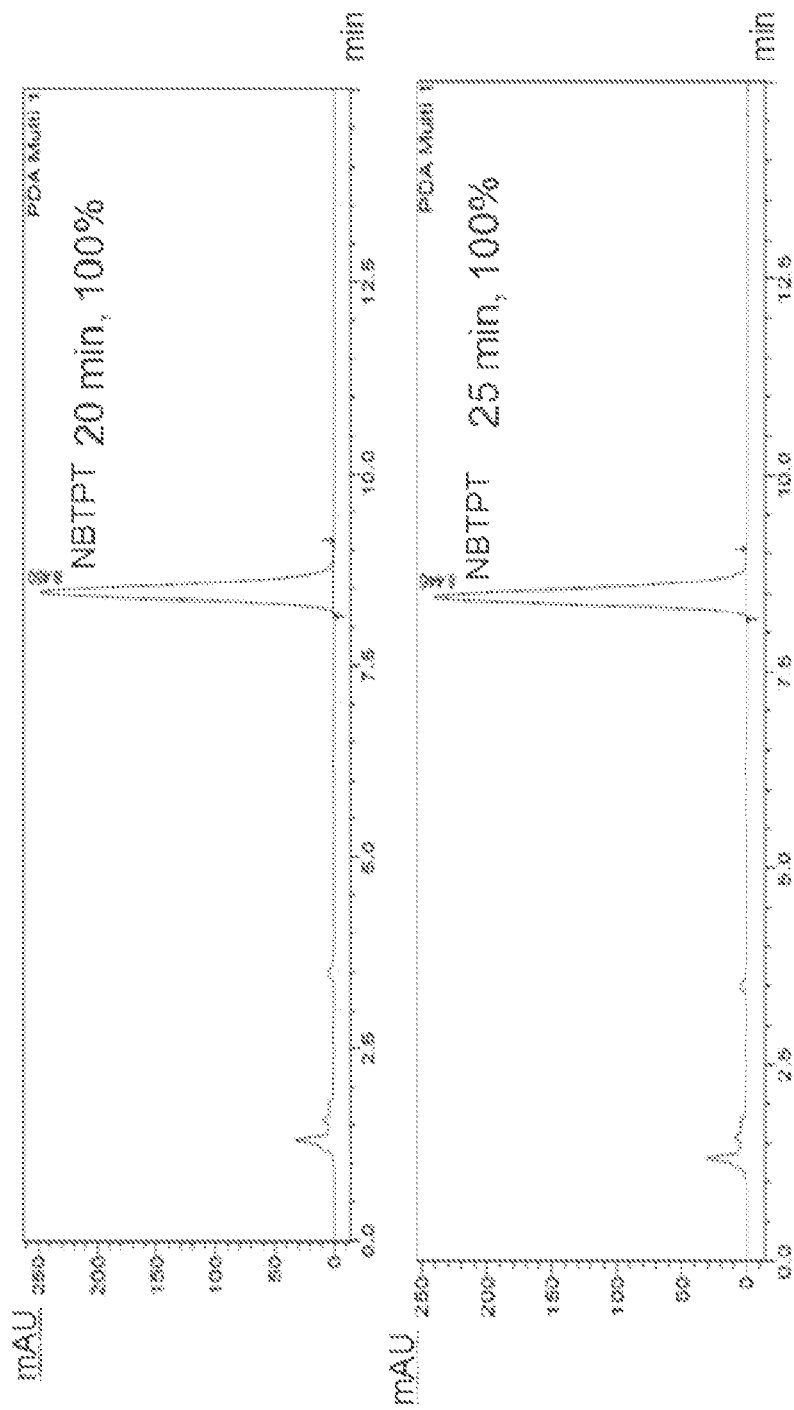
Figure 5:
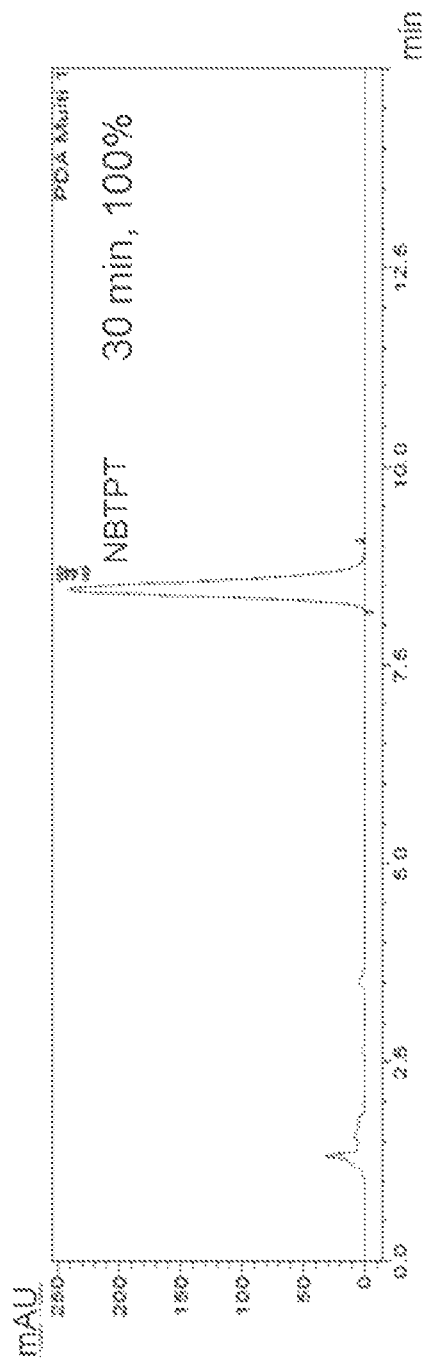

The fertilizers and methods disclosed herein protect the fertilizer additive from being directly exposed to the temperature of a urea melt during the manufacturing process. The core of the fertilizer comprises a binder, which protects the fertilizer additive from being directly exposed to the urea melt and the temperature of the urea melt. As such, the fertilizer additive is protected from the elevated temperature and is less likely to decompose. As shown in FIG. 5, NBTPT within a core is stable over time and does not decompose when the core is exposed to 133-135° C. Thus, the fertilizers and methods disclosed herein prevent loss of a fertilizer additive, such as, for example, without limitation, an inhibitor, for example NBTPT, during the manufacturing process.

Furthermore, the core disclosed herein is extrudable because of the binder. Thus, the binder also provides for a convenient method of producing a core having a consistent size and composition.

D. ASPECTS

The disclosed methods include at least the following aspects.

Aspect 1: A fertilizer capsule comprising one or more cores, wherein each of the one or more cores independently comprises one or more fertilizer additives and a binder, and wherein each of the one or more cores comprises from 10 wt % to 99 wt % of the binder.

Aspect 2: The fertilizer capsule of aspect 1, wherein each of the one or more cores comprises from 20 wt % to 99 wt % of the binder.

Aspect 3: The fertilizer capsule of aspect 1, wherein each of the one or more cores comprises from 30 wt % to 99 wt % of the binder.

Aspect 4: The fertilizer capsule of aspect 1, wherein each of the one or more cores comprises from 40 wt % to 99 wt % of the binder.

Aspect 5: The fertilizer capsule of aspect 1, wherein each of the one or more cores comprises from 40 wt % to 90 wt % of the binder.

Aspect 6: The fertilizer capsule of aspect 1, wherein each of the one or more cores independently comprises from 60 wt % to 95 wt % of the binder.

Aspect 7: The fertilizer capsule of any one of aspects 6, wherein the fertilizer capsule comprises two or more cores.

Aspect 8: The fertilizer capsule of any one of aspects 1-6, wherein the fertilizer capsule comprises one core.

Aspect 9: The fertilizer capsule of any one of aspects 1-8, wherein the binder is an extrudable binder.

Aspect 10: The fertilizer capsule of any one of aspects 1-9, wherein each of the one or more cores independently comprises two or more fertilizer additives.

Aspect 11: The fertilizer capsule of any one of aspects 1-10, wherein the one or more fertilizer additives are selected from an inhibitor, a micronutrient, a primary nutrient, or a secondary nutrient, or combination thereof.

Aspect 12: The fertilizer capsule of any one of aspects 1-11, wherein the one or more fertilizer additive comprises an inhibitor or a micronutrient, or a combination thereof.

Aspect 13: The fertilizer capsule of any one of aspects 1-11, wherein the one or more fertilizer additive comprises an inhibitor or a micronutrient and one or more additional fertilizer additives selected from an inhibitor, a micronutrient, a primary nutrient, or a secondary nutrient, or combination thereof.

Aspect 14: The fertilizer capsule of any one of aspects 1-11, wherein the one or more fertilizer additive comprises an inhibitor and a micronutrient and one or more additional fertilizer additives selected from an inhibitor, a micronutrient, a primary nutrient, or a secondary nutrient, or combination thereof.

Aspect 15: The fertilizer capsule of any one of aspects 11-14, wherein the inhibitor comprises N-(n-butyl) thiophosphoric triamide (NBTPT), 3,4-dimethylpyrazole phosphate (DMPP), thio-urea (TU), dicyandiamide (DCD), phenyl phosphorodiamidate (PPDA), 2-Chloro-6-(trichloromethyl)-pyridine (Nitrapyrin), 5-Ethoxy-3-trichloromethyl-1,2,4-thiadiazol (Terrazole), 2-Amino-4-chloro-6-methyl-pyrimidine (AM), 2-Mercaptobenzothiazole (MBT), or 2-Sulfanimalamidothiazole (ST), or a combination thereof.

Aspect 16: The fertilizer capsule of any one of aspects 11-15, wherein the micronutrient comprises inorganic or organometallic compounds of boron (B), copper (Cu), iron (Fe), chloride (Cl), manganese (Mn), molybdenum (Mo), nickel (Ni) or zinc (Zn), or a combination thereof.

Aspect 17: The fertilizer capsule of any one of aspects 11-16, wherein the primary nutrient comprises urea, ammonium nitrate, ammonium sulfate, diammonium phosphate, monoammonium phosphate, or urea-formaldehyde, or a combination thereof.

Aspect 18: The fertilizer capsule of any one of aspects 11-17, wherein the secondary nutrient comprises calcium (Ca), magnesium, (Mg), or sulfur (S), or a combination thereof.

Aspect 19: The fertilizer capsule of aspect 18, wherein the S is elemental S.

Aspect 20: The fertilizer capsule of any one of aspects 1-19, wherein each of the one or more cores independently comprises from greater than 0 wt % to 90 wt % of the one or more fertilizer additives.

Aspect 21: The fertilizer capsule of any one of aspects 1-20, wherein the fertilizer capsule further comprises an outer shell comprising urea or other nitrogen fertilizer or a combination thereof, wherein the outer shell at least partially surrounds each of the one or more cores.

Aspect 22: The fertilizer capsule of aspect 21, wherein the outer shell substantially surrounds each of the one or more cores.

Aspect 23: The fertilizer capsule of aspect 21, wherein the outer shell fully surrounds each of the one or more cores.

Aspect 24: The fertilizer capsule of any one of aspects 21-23, wherein the other nitrogen fertilizer comprises ammonium nitrate, ammonium sulfate, diammonium phosphate monoammonium phosphate, urea-formaldehyde, ammonium chloride, or potassium nitrate, or a combination thereof.

Aspect 25: The fertilizer capsule of any one of aspects 21-24, wherein the outer shell substantially comprises urea.

Aspect 26: The fertilizer capsule of any one of aspects 1-25, wherein the binder comprises a phosphate, a polyphosphate, a biodegradable polymer, or a wax, or a combination thereof.

Aspect 27: The fertilizer capsule of any one of aspects 1-25, wherein the binder comprises Plaster of Paris, flour, biodegradable bleached wheat flour, starch, or gluten, or combination thereof.

Aspect 28: The fertilizer capsule of any one of aspects 1-25, wherein the binder comprises polymers of, copolymers of, or blends of ethylene, propylene, acrylamide, acrylic acid, acrylonitrile, lactic acid, 3-hydroxy propionic acid, vinyl alcohol, lactide, or butylene succinate, or a combination thereof.

Aspect 29: The fertilizer capsule of any one of aspects 1-25, wherein the binder comprises Plaster of Paris.

Aspect 30: The fertilizer capsule of any one of aspects 1-25, wherein the binder comprises Plaster of Paris and flour comprising bleached wheat flour.

Aspect 31: The fertilizer capsule of any one of aspects 1-30, wherein each of the one or more cores independently further comprises a filler.

Aspect 32: The fertilizer capsule of aspect 31, wherein the filler comprises silica, colloidal silica, rice husk, dried distillers grains with solubles (DDGS), kaolin, bentonite, or other biomaterial, or a combination thereof.

Aspect 33: The fertilizer capsule of any one of aspects 31-32, wherein each of the one or more cores independently comprises from greater than 0 wt % to 59 wt % the filler.

Aspect 34: The fertilizer capsule of any one of aspects 1-33, wherein each of the one or more cores independently do not comprise B.

Aspect 35: The fertilizer capsule of any one of aspects 21-34, wherein the outer shell further comprises a micronutrient.

Aspect 36: The fertilizer capsule of aspect 35, wherein the micronutrient is B.

Aspect 37: The fertilizer capsule of any one of aspects 1-36, wherein each of the one or more cores has a crush strength of at least 2 kg/granule.

Aspect 38: The fertilizer capsule of any one of aspects 1-37, wherein each of the one or more cores has a diameter from 0.7 mm to 2.0 mm.

Aspect 39: The fertilizer capsule of any one of aspects 1-38, wherein each of the one or more cores is produced by an extrusion process.

Aspect 40: The fertilizer capsule of aspect 39, wherein the extrusion process is at a temperature from 0° C. to 140° C.

Aspect 41: The fertilizer capsule of aspects 39 or 40, wherein the extrusion process is at a screw speed from 1 to 500 rpm.

Aspect 42: The fertilizer capsule of any one of aspects 1-41, wherein the fertilizer capsule does not comprise calcium cyanamide.

Aspect 43: The fertilizer capsule of any one of aspects 1-42, wherein each of the one or more cores comprises from 30 wt % to 50 wt % of Plaster of Paris and from 20 wt % to 40 wt % of flour comprising bleached wheat flour.

Aspect 44: The fertilizer capsule of any one of aspects 1-43, wherein each of the one or more cores comprises from 10 wt % to 50 wt % of DCD and from more than 0 wt % wt to 5 wt % of NBTPT.

Aspect 45: The fertilizer capsule of any one of aspects 1-43, wherein each of the one or more cores comprises from 30 wt % to 50 wt % of DCD and from more than 0 wt % wt to 5 wt % of NBTPT.

Aspect 46: The fertilizer capsule of any one of aspects 1-43, wherein each of the one or more cores comprises from 10 wt % to 30 wt % of DCD and from more than 0 wt % wt to 5 wt % of NBTPT.

Aspect 47: The fertilizer capsule of any one of aspects 1-43, wherein each of the one or more cores comprises from 30 wt % to 50 wt % of Plaster of Paris, from 20 wt % to 40 wt % of flour comprising bleached wheat flour, from 10 wt % to 30 wt % of DCD, and from more than 0 wt % to 5 wt % of NBTPT.

Aspect 48: The fertilizer capsule of any one of aspects 1-43, wherein each of the one or more cores comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT.

Aspect 49: The fertilizer capsule of any one of aspects 1-43, wherein each of the one or more cores comprises from 30 wt % to 50 wt % of Plaster of Paris, from 20 wt % to 40 wt % of flour comprising bleached wheat flour, from 10 wt % to 30 wt % of DCD, and from more than 0 wt % to 5 wt % of NBTPT, and wherein an outer shell substantially comprising urea at least partially surrounds the core.

Aspect 50: The fertilizer capsule of any one of aspects 1-43, wherein each of the one or more cores comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT, and wherein an outer shell substantially comprising urea at least partially surrounds the core.

Aspect 51: The fertilizer capsule of any one of aspects 11-43, wherein each of the one or more cores comprises from 20 wt % to 90 wt % of the binder and from 80 wt % to 10 wt % of the inhibitor.

Aspect 52: The fertilizer capsule of any one of aspects 11-43, wherein each of the one or more cores comprises from 50 wt % to 90 wt % of the binder and from 50 wt % to 10 wt % of the inhibitor.

Aspect 53: The fertilizer capsule of any one of aspects 11-43, wherein each of the one or more cores comprises from greater than 0 wt % to 54 wt % of the inhibitor.

Aspect 54: The fertilizer capsule of any one of aspects 11-43, wherein each of the one or more cores comprises from greater than 0 wt % to 50 wt % of the micronutrient on an atom basis.

Aspect 55: The fertilizer capsule of aspect 54, wherein each of the one or more cores comprises from greater than 0 wt % to 20 wt % of urea or other nitrogen fertilizer or combination thereof.

Aspect 56: The fertilizer capsule of aspects 31-55, wherein each of the one or more cores comprises from greater than 0 wt % to 60 wt % of the filler.

Aspect 57: The fertilizer capsule of any one of aspects 1-56, wherein each of the one or more cores comprises an inhibitor and, wherein the core does not comprise a micronutrient.

Aspect 58: The fertilizer capsule of any one of aspects 1-56, wherein each of the one or more cores comprises a micronutrient and, wherein the core does not comprise an inhibitor.

Aspect 59: The fertilizer capsule of any one of aspects 11-58, the inhibitor comprises DCD.

Aspect 60: The fertilizer capsule of any one of aspects 11-59, wherein the inhibitor comprises DCD and NBTPT.

Aspect 61: A fertilizer capsule comprising a core comprising an inhibitor or a micronutrient or a combination thereof and a binder, wherein the inhibitor comprises NBTPT, DMPP, TU, DCD, PPDA, Nitrapyrin, Terrazole, AM, MBT, or ST, or a combination thereof, and wherein the core comprises from 10 wt % to 99 wt % of the binder.

Aspect 62: The fertilizer capsule of aspect 61, wherein the core comprises from 20 wt % to 99 wt % of the binder.

Aspect 63: The fertilizer capsule of aspect 61, wherein the core comprises from 30 wt % to 99 wt % of the binder.

Aspect 64: The fertilizer capsule of aspect 61, wherein the core comprises from 40 wt % to 99 wt % of the binder.

Aspect 65: The fertilizer capsule of aspect 61, wherein the core comprises from 40 wt % to 90 wt % of the binder.

Aspect 66: The fertilizer capsule of any one of aspects 61-65, wherein the fertilizer capsule further comprises a shell comprising urea or other nitrogen fertilizer or a combination thereof, wherein the shell surrounds or partially surrounds the core.

Aspect 67: The fertilizer capsule of aspect 66, wherein shell substantially comprises urea.

Aspect 68: The fertilizer capsule of one of aspects 61-67, wherein the core comprises an inhibitor and a micronutrient.

Aspect 69: The fertilizer capsule of any one of aspects 61-68, wherein the core comprises from 60 wt % to 95 wt % of the binder.

Aspect 70: The fertilizer capsule of any one of aspects 61-69, wherein the binder comprises a phosphate, a polyphosphate, a biodegradable polymer, or a wax, or a combination thereof.

Aspect 71: The fertilizer capsule of any one of aspects 61-69, wherein the binder comprises Plaster of Paris, flour, starch, or gluten, or combination thereof.

Aspect 72: The fertilizer capsule of aspect 71, wherein the binder comprises a flour comprising bleached wheat flour.

Aspect 73: The fertilizer capsule of aspect 71, wherein the binder comprises Plaster of Paris.

Aspect 74: The fertilizer capsule of aspect 71 wherein the binder comprises Plaster of Paris and flour comprising bleached wheat flour.

Aspect 75: The fertilizer capsule of any one of aspects 61-74, wherein core comprises from 20 wt % to 90 wt % of the binder and from 80 wt % to 10 wt % of the inhibitor.

Aspect 76: The fertilizer capsule of any one of aspects 61-74, wherein core comprises from 50 wt % to 90 wt % of the binder and from 50 wt % to 10 wt % of the inhibitor.

Aspect 77: The fertilizer capsule of aspects 75 or 76, wherein the binder comprises Plaster of Paris.

Aspect 78: The fertilizer capsule of aspects 75 or 76, wherein the inhibitor comprises DCD.

Aspect 79: The fertilizer capsule of aspects 75 or 76, wherein the binder comprises Plaster of Paris and flour comprising bleached wheat flour.

Aspect 80: The fertilizer capsule of aspects 75 or 76, wherein the inhibitor comprises DCD and NBTPT.

Aspect 81: The fertilizer capsule of any one of aspects 61-80 wherein the core comprises from 30 wt % to 50 wt % of Plaster of Paris and from 20 wt % to 40 wt % of flour comprising bleached wheat flour.

Aspect 82: The fertilizer capsule of any one of aspects 61-81, wherein the core comprises from 10 wt % to 50 wt % of DCD and from more than 0 wt % wt to 5 wt % of NBTPT.

Aspect 83: The fertilizer capsule of any one of aspects 61-81, wherein the core comprises from 30 wt % to 50 wt % of DCD and from more than 0 wt % wt to 5 wt % of NBTPT.

Aspect 84: The fertilizer capsule of any one of aspects 61-81, wherein the core comprises from 10 wt % to 30 wt % of DCD and from more than 0 wt % wt to 5 wt % of NBTPT.

Aspect 85: The fertilizer capsule of any one of aspects 61-81, wherein the core comprises from 30 wt % to 50 wt % of Plaster of Paris, from 20 wt % to 40 wt % of flour comprising bleached wheat flour, from 10 wt % to 30 wt % of DCD, and from more than 0 wt % to 5 wt % of NBTPT.

Aspect 86: The fertilizer capsule of any one of aspects 61-81, wherein the core comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT.

Aspect 87: The fertilizer capsule of any one of aspects 61-81, wherein the core comprises from 30 wt % to 50 wt % of Plaster of Paris, from 20 wt % to 40 wt % of flour comprising bleached wheat flour, from 10 wt % to 30 wt % of DCD, and from more than 0 wt % to 5 wt % of NBTPT, and wherein a shell substantially comprising urea surrounds or partially surrounds the core.

Aspect 88: The fertilizer capsule of any one of aspects 61-81, wherein the core comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT, and wherein a shell substantially comprising urea surrounds or partially surrounds the core.

Aspect 89: The fertilizer capsule of any one of aspects 61-88, wherein the core further comprises urea or other nitrogen fertilizer or a combination thereof.

Aspect 90: The fertilizer capsule of any one of aspects 61-89, wherein the core further comprises a filler.

Aspect 91: The fertilizer capsule of aspect 90, wherein the filler comprises silica, colloidal silica, rice husk, dried distillers grains with solubles (DDGS), kaolin, bentonite, or other biomaterial, or a combination thereof.

Aspect 92: The fertilizer capsule of any one of aspects 61-91, wherein the core comprises from greater than 0 wt % to 54 wt % of the inhibitor.

Aspect 93: The fertilizer capsule of any one of aspects 61-92, wherein the core comprises from greater than 0 wt % to 50 wt % of the micronutrient on an atom basis.

Aspect 94: The fertilizer capsule of aspect 89, wherein the core comprises from greater than 0 wt % to 20 wt % of urea or other nitrogen fertilizer or combination thereof.

Aspect 95: The fertilizer capsule of aspects 90 or 91, wherein the core comprises from greater than 0 wt % to 60 wt % of the filler.

Aspect 96: The fertilizer capsule of any one of aspects 61-95, wherein the core has a crush strength of at least 2 kg/granule.

Aspect 97: The fertilizer capsule of any one of aspects 61-96, wherein the core has a diameter from 0.7 mm to 2.0 mm.

Aspect 98: The fertilizer capsule of any one of aspects 61-97, wherein the core is produced by an extrusion process at a temperature from 0° C. to 140° C. and a screw speed from 1 to 500 rpm.

Aspect 99: The fertilizer capsule of any one of aspects 61-98, wherein the fertilizer capsule does not comprise calcium cyanamide.

Aspect 100: The fertilizer capsule of any one of aspects 61-99, wherein the micronutrient comprises inorganic and organometallic compounds of B, Cu, Fe, Cl, Mn, Mo, or Zn, or a combination thereof.

Aspect 101: The fertilizer capsule of any one of aspects 61-100, wherein the core further comprises Mg or Ca or a combination thereof.

Aspect 102: The fertilizer capsule of any one of aspects 61-101, wherein the core comprises an inhibitor and, wherein the core does not comprise a micronutrient.

Aspect 103: The fertilizer capsule of any one of aspects 61-102, wherein the core comprises a micronutrient and, wherein the core does not comprise an inhibitor.

Aspect 104: A method for preparing a fertilizer capsule core comprising the step of: a) extruding a mixture comprising an inhibitor or a micronutrient or a combination thereof and a binder, thereby forming a core, wherein the inhibitor comprises NBTPT, DMPP, TU, DCD, PPDA, Nitrapyrin, Terrazole, AM, MBT, or ST or a combination thereof.

Aspect 105: The method of aspect 104, wherein extruding comprises extruding from a extruder at a temperature from 0° C. to 140° C. and a screw speed from 1 to 500 rpm, wherein the extruder comprises a multi-feeder comprising extrusion components.

Aspect 106: The method of aspects 104 or 105, wherein method further comprises slicing the extrudate, thereby forming a core having a diameter and a length from 0.7 mm to 2.0 mm.

Aspect 107: The method of any one of aspects 104-106, wherein the method further comprises the step of fattening the core with a shell comprising urea or other nitrogen fertilizer, thereby forming a fertilizer capsule.

Aspect 108: The method of aspect 107, wherein the fertilizer capsule has a size from 1.5 mm to 8.0 mm.

Aspect 109: The method of any one of aspects 104-108, wherein the core comprises from 40 wt % to 99 wt % of the binder.

Aspect 110: The method of any one of aspects 104-109 wherein the core comprises from 60 wt % to 95 wt % of the binder.

Aspect 111: The method of any one of aspects 104-110, wherein the core comprises an inhibitor and a micronutrient.

Aspect 112: The method of any one of aspects 104-111, wherein the binder comprises a phosphate, a polyphosphate, a biodegradable polymer, or a wax, or a combination thereof.

Aspect 113: The method of any one of aspects 104-112, wherein the binder comprises Plaster of Paris, flour, starch, or gluten, or combination thereof.

Aspect 114: The method of aspect 113, wherein the binder comprises a flour comprising bleached wheat flour.

Aspect 115: The method of aspect 113, wherein the binder comprises Plaster of Paris.

Aspect 116: The method of aspect 113, wherein the binder comprises Plaster of Paris and flour comprising bleached wheat flour.

Aspect 117: The method of any one of aspects 104-116, wherein core comprises from 20 wt % to 90 wt % of the binder and from 80 wt % to 10 wt % of the inhibitor.

Aspect 118: The method of any one of aspects 104-116, wherein core comprises from 50 wt % to 90 wt % of the binder and from 50 wt % to 10 wt % of the inhibitor.

Aspect 119: The method of aspects 117 or 118, wherein the binder comprises Plaster of Paris.

Aspect 120: The method of aspects 117 or 118, wherein the inhibitor comprises DCD.

Aspect 121: The method of aspects 117 or 118, wherein the binder comprises Plaster of Paris and flour comprising bleached wheat flour.

Aspect 122: The method of aspects 117 or 118, wherein the inhibitor comprises DCD and NBTPT.

Aspect 123: The method of any one of aspects 104-122, wherein the core comprises from 30 wt % to 50 wt % of Plaster of Paris and from 20 wt % to 40 wt % of flour comprising bleached wheat flour.

Aspect 124: The method of any one of aspects 104-123, wherein the core comprises from 10 wt % to 50 wt % of DCD and from more than 0 wt % to 5 wt % of NBTPT.

Aspect 125: The method of any one of aspects 104-124, wherein the core comprises from 30 wt % to 50 wt % of DCD and from more than 0 wt % to 5 wt % of NBTPT.

Aspect 126: The method of any one of aspects 104-124, wherein the core comprises from 10 wt % to 30 wt % of DCD and from more than 0 wt % to 5 wt % of NBTPT.

Aspect 127: The method of any one of aspects 104-124, wherein the core comprises from 30 wt % to 50 wt % of Plaster of Paris, from 20 wt % to 40 wt % of flour comprising bleached wheat flour, from 10 wt % to 30 wt % of DCD, and from more than 0% wt to 5% wt of NBTPT.

Aspect 128: The method of any one of aspects 104-124, wherein the core comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT.

Aspect 129: The method of any one of aspects 104-124, wherein the core comprises from 30 wt % to 50 wt % of Plaster of Paris, from 20 wt % to 40 wt % of flour comprising bleached wheat flour, from 10 wt % to 30 wt % of DCD, and from more than 0% wt to 5 wt % of NBTPT, and wherein a shell substantially comprising urea surrounds or partially surrounds the core.

Aspect 130: The method of any one of aspects 104-124, wherein the core comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT, and wherein a shell substantially comprising urea surrounds or partially surrounds the core.

Aspect 131: The method of any one of aspects 104-124, wherein the core further comprises urea or other nitrogen fertilizer or a combination thereof.

Aspect 132: The method of any one of aspects 104-131, wherein the core further comprises a filler.

Aspect 133: The method of aspect 132, wherein the filler comprises silica, colloidal silica, rice husk, dried distillers grains with solubles (DDGS), kaolin, bentonite, or other biomaterial, or a combination thereof.

Aspect 134: The method of any one of aspects 104-133 wherein the core comprises from greater than 0 wt % to 54 wt % of the inhibitor.

Aspect 135: The method of any one of aspects 104-134, wherein the core comprises from greater than 0 wt % to 50 wt % of the micronutrient on an atom basis.

Aspect 136: The method of aspect 131, wherein the core comprises from greater than 0 wt % to 20 wt % of urea or other nitrogen fertilizer or a combination thereof.

Aspect 137: The method of aspects 132 or 133, wherein the core comprises from greater than 0 wt % to 60 wt % of the filler.

Aspect 138: The method of any one of aspects 104-137, wherein the core has a crush strength of at least 2 kg/granule.

Aspect 139: The method of any one of aspects 104-138, wherein the micronutrient comprises inorganic and organometallic compounds of B, Cu, Fe, Cl, Mn, Mo, or Zn, or a combination thereof.

Aspect 140: The method of any one of aspects 104-139, the core further comprises Mg or Ca or a combination thereof.

Aspect 141: The method of any one of aspects 104-140, wherein the binder comprises Plaster of Paris, flour, starch, or gluten, or combination thereof, and wherein the mixture has a moisture content from greater than 0 wt % to 40 wt %.

Aspect 142: The method of any one of aspects 104-141, wherein the method further comprises heating the core in a spheronizer, thereby producing a core with a substantially spherical shape, wherein core has a moisture content from greater than 0 wt % to 4 wt %.

Aspect 143: The method of any one of aspects 104-110 or 112-142, wherein the core comprises an inhibitor and, wherein the core does not comprise a micronutrient.

Aspect 144: The method of any one of aspects 104-110 or 112-142, wherein the core comprises a micronutrient and, wherein the core does not comprise an inhibitor.

Aspect 145: A method for preparing a fertilizer capsule core comprising the step of: a) extruding a mixture comprising one or more fertilizer additives and an extrudable binder, thereby forming a core.

Aspect 146: The method of aspect 145, wherein extruding comprises extruding from a extruder at a temperature from 0° C. to 140° C. and a screw speed from 1 to 500 rpm, wherein the extruder comprises a multi-feeder comprising extrusion components.

Aspect 147: The method of aspects 145 or 146, wherein method further comprises slicing the extrudate, thereby forming a core having a longest dimension from 0.7 mm to 2.0 mm.

Aspect 148: The method of any one of aspects 145-147, wherein the method further comprises the step of fattening the core with a shell comprising urea or other nitrogen fertilizer, thereby forming a fertilizer capsule.

Aspect 149: The method of aspect 148, wherein the fertilizer capsule has a longest dimension from 1.5 mm to 8.0 mm.

Aspect 150: The method of any one of aspects 145-149, wherein the core comprises from 10 wt % to 99 wt % of the extrudable binder.

Aspect 151: The method of any one of aspects 145-150, wherein the core comprises from 60 wt % to 95 wt % of the extrudable binder.

Aspect 152: The method of any one of aspects 145-151, wherein the one or more fertilizer additives are selected from an inhibitor, a micronutrient, a primary nutrient, or a secondary nutrient, or combination thereof.

Aspect 153: The method of aspect 152, wherein the one or more fertilizer additives comprises an inhibitor or a micronutrient, or a combination thereof.

Aspect 154: The method of aspect 152, wherein the one or more fertilizer additives comprises an inhibitor or a micronutrient and one or more additional fertilizer additives selected from an inhibitor, a micronutrient, a primary nutrient, or a secondary nutrient, or combination thereof.

Aspect 155: The method of aspect 152, wherein the one or more fertilizer additives comprises an inhibitor and a micronutrient and one or more additional fertilizer additives selected from an inhibitor, a micronutrient, a primary nutrient, or a secondary nutrient, or combination thereof.

Aspect 156: The method of any one of aspects 145-155, wherein the extrudable binder comprises a phosphate, a polyphosphate, a biodegradable polymer, or a wax, or a combination thereof.

Aspect 157: The method of any one of aspects 145-155, wherein the extrudable binder comprises Plaster of Paris, flour, biodegradable bleached wheat flour, starch, or gluten, or combination thereof.

Aspect 158: The method of any one of aspects 145-155, wherein the extrudable binder comprises polymers of, copolymers of, or blends of ethylene, propylene, acrylamide, acrylic acid, acrylonitrile, lactic acid, 3-hydroxy propionic acid, vinyl alcohol, lactide, or butylene succinate, or a combination thereof.

Aspect 159: The method of any one of aspects 145-155, wherein the extrudable binder comprises Plaster of Paris.

Aspect 160: The method of any one of aspects 145-159, wherein the core further comprises a filler.

Aspect 161: The method of aspect 160, wherein the filler comprises silica, colloidal silica, rice husk, dried distillers grains with solubles (DDGS), kaolin, bentonite, or other biomaterial, or a combination thereof.

Aspect 162: The method of any one of aspects 145-161, wherein the core comprises from greater than 0 wt % to 89 wt % of the inhibitor.

Aspect 163: The method of any one of aspects 145162, wherein the core comprises from greater than 0 wt % to 50 wt % of the micronutrient on an atom basis.

Aspect 164: The fertilizer capsule of aspects 145 or 163, wherein the core comprises from greater than 0 wt % to 60 wt % of the filler.

Aspect 165: The method of any one of aspects 145-164, wherein the core has a crush strength of at least 2 kg/granule.

Aspect 166: The method of any one of aspects 145-165, wherein the extrudable binder comprises Plaster of Paris, flour, starch, or gluten, or combination thereof, and wherein the mixture has a moisture content from greater than 0 wt % to 40 wt %.

Aspect 167: The method of any one of aspects 145-166, wherein the method further comprises heating the core in a spheronizer, thereby producing a core with a substantially spherical shape, wherein core has a moisture content from greater than 0 wt % to 4 wt %.

Aspect 168: The method of any one of aspects 152-167, wherein the core comprises an inhibitor and, wherein the core does not comprise a micronutrient.

Aspect 169: The method of any one of aspects 152-167, wherein the core comprises a micronutrient and, wherein the core does not comprise an inhibitor.

Aspect 170: The method of aspect 157, wherein the binder comprises a flour comprising bleached wheat flour.

Aspect 171: The method of aspect 157, wherein the binder comprises Plaster of Paris and flour comprising bleached wheat flour.

Aspect 172: The method of any one of aspects 145-171, wherein core comprises from 20 wt % to 90 wt % of the binder and from 80 wt % to 10 wt % of the inhibitor.

Aspect 173: The method of any one of aspects 145-171, wherein core comprises from 50 wt % to 90 wt % of the binder and from 50 wt % to 10 wt % of the inhibitor.

Aspect 174: The method of aspects 172 or 173, wherein the binder comprises Plaster of Paris.

Aspect 175: The method of aspects 172 or 173, wherein the inhibitor comprises DCD.

Aspect 176: The method of aspects 172 or 173, wherein the binder comprises Plaster of Paris and flour comprising bleached wheat flour.

Aspect 177: The method of aspects 172 or 173, wherein the inhibitor comprises DCD and NBTPT.

Aspect 178: The method of any one of aspects 145-177, wherein the core comprises from 30 wt % to 50 wt % of Plaster of Paris and from 20 wt % to 40 wt % of flour comprising bleached wheat flour.

Aspect 179: The method of any one of aspects 145-178, wherein the core comprises from 10% to 50% of DCD and from more than 0 wt % to 5 wt % of NBTPT.

Aspect 180: The method of any one of aspects 145-178, wherein the core comprises from 30% to 50% of DCD and from more than 0 wt % to 5 wt % of NBTPT.

Aspect 181: The method of any one of aspects 145-178, wherein the core comprises from 10 wt % to 30 wt % of DCD and from more than 0 wt % to 5 wt % of NBTPT.

Aspect 182: The method of any one of aspects 145-178, wherein the core comprises from 30 wt % to 50 wt % of Plaster of Paris, from 20 wt % to 40 wt % of flour comprising bleached wheat flour, from 10% to 30% of DCD, and from more than 0 wt % to 5 wt % of NBTPT.

Aspect 183: The method of any one of aspects 145-178, wherein the core comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT.

Aspect 184: The method of any one of aspects 145-178, wherein the core comprises from 30 wt % to 50 wt % of Plaster of Paris, from 20 wt % to 40 wt % of flour comprising bleached wheat flour, from 10 wt % to 30 wt % of DCD, and from more than 0 wt % to 5 wt % of NBTPT, and wherein a shell substantially comprising urea surrounds or partially surrounds the core.

Aspect 185: The method of any one of aspects 145-178, wherein the core comprises from 20 wt % to 40 wt % of Plaster of Paris, from 10 wt % to 30 wt % of flour comprising bleached wheat flour, from 30 wt % to 50 wt % of DCD, and from more than 0 wt % to 5 wt % of NBTPT, and wherein a shell substantially comprising urea surrounds or partially surrounds the core.

Aspect 186: The method of any one of aspects 145-185, wherein the core further comprises urea or other nitrogen fertilizer or a combination thereof.

Aspect 187: The method of any one of aspects 145-186, wherein the core comprises from greater than 0 wt % to 54 wt % of the inhibitor.

Aspect 188: The method of any one of aspects 145-187, wherein the core comprises from greater than 0 wt % to 50 wt % of the micronutrient on an atom basis.

Aspect 189: The method of aspect 186 wherein the core comprises from greater than 0 wt % to 20 wt % of urea or other nitrogen fertilizer or a combination thereof.

Aspect 190: The fertilizer capsule of aspects 188 or 189, wherein the core comprises from greater than 0 wt % to 60 wt % of the filler.

Aspect 191: The method of any one of aspects 145-190, wherein the micronutrient comprises inorganic or organometallic compounds of of B, Cu, Fe, Cl, Mn, Mo, Ni, or Zn, or a combination thereof.

Aspect 192: The method of any one of aspects 145-191, the core further comprises Mg or Ca or a combination thereof.

Aspect 193: The method of any one of aspects 11-60, wherein the one or more fertilizer additive comprises an inhibitor, wherein the inhibitor comprises a urease inhibitor or a nitrification inhibitor, or a combination thereof.

Aspect 194: The method of any one of aspects 11-60 or 193, wherein the inhibitor comprises a urease inhibitor and a nitrification inhibitor.

Aspect 195: The method of any one of aspects 11-60, 193 or 194, wherein the urease inhibitor comprises N-(n-butyl) thiophosphoric triamide (NBTPT) or phenyl phosphorodiamidate (PPDA), or a combination thereof, and wherein the nitrification inhibitor comprises 3,4-dimethylpyrazole phosphate (DMPP), thio-urea (TU), dicyandiamide (DCD), 2-Chloro-6-(trichloromethyl)-pyridine (Nitrapyrin), 5-Ethoxy-3-trichloromethyl-1,2,4-thiadiazol (Terrazole), 2-Amino-4-chloro-6-methyl-pyrimidine (AM), 2-Mercaptobenzothiazole (MBT), or 2-Sulfanimalamidothiazole (ST), or a combination thereof.

E. EXAMPLES

The following examples are put forth so as to provide those of ordinary skill in the art with a complete disclosure and description of how the compounds, compositions, articles, devices, and/or methods described and aspected herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

1. Example 1

Described herein are fertilizer compositions that can be made using an extrusion process. Provided in this example are exemplary procedures for making core particles containing inhibitors and/or micronutrients for enhanced efficiency fertilizers.

i. Materials

Technical grade urea was received from SABIC, P.O. Box 5101, Riyadh 11422, Saudi Arabia. Waxes such as soy wax, palm wax and castor wax were received as samples from Ruchi Soya Industries Ltd., Indore, India. Castor wax (50 Kg) was obtained from K.R. Enterprises, Sivakasi, Tamil Nadu, India. Starches were received as samples from Angel starch, Erode, Tamil Nadu, India. High melting waxes (Qualiwax-C, Qualiwax QD flakes and Qualiwax QD-150) were received as samples from Quality Chemical Industries, Navi Mumbai, India. Bleached wheat flour was purchased from Sri Bhagyalakshmi maida, Bengaluru local market. N-(n-butyl) thiophosphoric triamide (NBTPT) was purchased from Samich (HK) Ltd., Hangzhou, China. All remaining commercially available reagents were purchased from Sigma-Aldrich, India.

ii. Equipment

For extrusion, Micro compounder (DACA, a lab scale mini extruder), pilot scale twin screw extruder (Coperion), wire press and room temperature twin screw extruder was used. Z-blade twin screw mixer with ~40 rpm (NH-2L kneader) was used for uniform mixing of bleached wheat flour and other additives for wet extrusion.

iii. Procedure

Representative procedure for mini extruder (DACA): The raw materials (mainly waxes) were weighed to the nearest accuracy. The other additives needed were added to the molten waxes, mixed thoroughly, and poured on glass tray to crush the material in to small flakes. The extrusions were carried out using micro compounder (DACA, a lab scale vertical twin screw extruder). The experiments were carried out at a processing temperature ranging from 50° C.-100° C. by keeping the screw speed between 60-80 rpm. The flaky to powdered material was added through the hopper slowly by keeping the load constant. The extrudates were collected as strands and dried at room temperature.

Representative procedure for pilot scale extruder: The raw materials needed for formulations were weighed to the nearest accuracy and mixed thoroughly. The compounding operations were carried out in a W&P ZSK25 Twin Screw Extruder with a 25 mm screw diameter on a 6-barrel. The screw configuration was designed with sufficient kneading elements to get maximum shear for better mixing. The experiments were carried out at a processing temperature ranging from 80° C.-140° C. Screw speed was between 60-100 rpm and the material was added through the main hopper at 6-8 kg/hr. The extrudates were collected out of the die at the end of the extruder in a tray and allowed to cool.

Representative procedure for wire press (small scale manual extruder): The raw materials needed for formulations were weighed, mixed thoroughly in a mortar and pestle while adding minimal quantity of water to have extrudable dough form. The dough was transferred to a vessel having a 1.0 or 1.5 mm die and probe was screwed slowly at constant speed. This entire process was carried out at room temperature. The extrudates were collected out of the die in a tray and dried.

Representative procedure for room temperature extruder: The raw materials needed for formulations were weighed to the nearest accuracy and mixed thoroughly using Z-blade twin screw mixer with ~40 rpm (NH-2L kneader). Active ingredients were added followed by water slowly while mixing and continued the mixing until consistent dough is obtained (in 1 h). The dough was introduced into extruder (F-26 Twin Screw Banded Extruder) in the form of round bars at 100 rpm to get extrudates that were collected out of the die (1.0 or 1.5 mm) in a tray. The mixing and extrusion was carried out at room temperature. The extrudates were dried at 65-80° C. for 1 to 3 hrs. before taking for further analysis.

Representative procedure for checking the Inhibitor stability in urea melt: The extrudate (1.0 g) was added to a vial containing urea melt (3.0 g) and it was left at the same temperature for one minute. The Vial was then cooled to room temperature and diluted with 5.0 ml of water (milli-Q water). The water was decanted and the same process was repeated twice, to remove most of the urea. Finally, water (5.0 ml) was added to the extrudate and left for 4 h before submitting the samples for HPLC analysis.

The thermal stability of neat NBTPT and NBTPT contained within a core, as disclosed herein, can be determined by HPLC. For example, neat NBTPT or a core containing NBTPT can be exposed to 135° C. (133-135° C. is the typical temperature range of a urea melt) and can continuously be analyzed by HPLC every 5 min. Such data will determine how whether the NBTPT has better thermal stability when contained within a core, as compared to neat NBTPT.

iv. Sample Analysis and Results

Analytical characterization: Melting point and thermal degradation properties of waxes and inhibitors (NBTPT and DCD) were confirmed using DSC and TGA analysis. The purity of NBTPT and DCD was cross-checked by NMR, HPLC and LCMS analysis.

Physical strength: The physical strength refers to the strength of the extrudates as observed by breaking the strands manually. The strength is depicted as "+". The best physical appearance was shown as +++++. All formulations are listed in four tables were carried out in four different kinds of extruders. The physical strength of the extrudate is shown with plus signs where +++++=excellent, ++++=very good, +++=good, ++=fair, and +=poor.

Crush Strength: Crush strength was measured for some of the samples using crush strength analyzer to know the strength of the extrudate.

Stability of inhibitors in urea melt: Extrudates containing inhibitors were tested for their stability in urea melt using HPLC and LCMS.

Moisture analysis: moisture content of bleached wheat flour and wax extrudates was measured using moisture analyzer.

The following relates to the information shown in Table 1. A wide range of waxes was chosen based on their melting point for preliminary screening of binders for making the core particle containing inhibitors and/or micronutrients. One of the advantages of using waxes is to have water free formulations. The soy, palm and castor waxes were extruded in the DACA and screened based on their physical strength (Table 1). Out of these three waxes, castor wax had better physical strength in comparison with others, and the same was chosen for remaining formulations. The different percentages of additives (Whitrin starch, bleached wheat flour, wheat flour, etc.) were tried along with the castor wax to further improve the strength of the strand. Among these, Whitrin starch (50%) showed the best result. Attempts to increase the percentage of Whitrin starch in castor wax failed to give extrudates in DACA. Formulations containing inhibitors (NBTPT and DCD) and micronutrients (Zn in the form of ZnO) were successfully extruded with good strength. As castor wax extrudates showed the deformation under urea melt temperature conditions (experiment performed by dipping the extrudate in urea melt), Qualiwax-C was chosen as an alternative binder whose melting point is above urea melting point for making the core particle. The physical strength of the Qualiwax-C extrudates was further improved by adding rice husk as filler. The cores containing Qualiwax-C and inhibitors were successfully extruded in DACA.

TABLE 1

| Formulation | Castor wax (%) | Palm wax (%) | Bleached wheat flour (%) | Qualiwax-C | NBTPT (%) | DCD (%) | Others (%) | Physical strength |
|---|---|---|---|---|---|---|---|---|
| F-1 | — | — | — | — | — | — | 100 (soy wax) | + |
| F-2 | — | 100 | | | | | — | +++ |
| F-3 | 100 | — | | | | | | +++ |
| F-4 | 50 | | 50 | | | | | ++ |
| F-5 | 80 | | 20 | | | | | ++ |
| F-6 | 90 | | 10 | | | | | +++ |
| F-7 | 95 | | 5 | | | | | +++++ |
| F-8 | 97.5 | | 2.5 | | | | | + |
| F-9 | 90 | | — | | | | 10 (wheat flour) | ++ |
| F-10 | 90 | | | — | — | — | 10 (MgSO$_4$) | ++ |
| F-11 | — | 90 | 10 | | | | — | ++ |
| F-12 | — | 95 | 5 | | | | | ++ |
| F-15 | 99 | | | | 1 | | — | ++++ |
| F-16 | 95 | | | | — | | 05 (ZnO) | +++++ |
| F-17 | 90 | | | | | | 10 (urea) | ++ |
| F-18 | 95 | | | | 5 | | — | +++++ |
| F-19 | 50 | | | | — | | 50 (starch Whitrin) | +++++ |
| F-21 | 90 | | | | 10 | — | | ++++ |
| F-22 | 70 | | | | 30 | | | +++++ |
| F-23 | — | — | — | 100 | — | — | | ++++ |
| F-24 | — | — | — | 50 | — | — | 50 (rice husk) | +++++ |
| F-25 | — | — | — | 95 | 5 | — | | ++++ |
| F-26 | — | — | — | 70 | | 30 | — | +++++ |
| F-27 | — | — | — | 47.5 | 5 | — | 47.5 (rice husk) | +++++ |

TABLE 1-continued

| Formulation | Castor wax (%) | Palm wax (%) | Bleached wheat flour (%) | Qualiwax-C | NBTPT (%) | DCD (%) | Others (%) | Physical strength |
|---|---|---|---|---|---|---|---|---|
| F-28 | — | — | — | 35 | — | 30 | 35 (rice husk) | +++++ |

The following relates to the information shown in Table 2. Optimized formulations from the DACA were successfully extruded in the pilot scale extruder in 300 g scale. 100% bleached wheat flour was also extruded with 10-20% water which was not done in DACA. Water containing extrudates were dried in oven at 120° C. for overnight, and NBTPT was found to be stable at this temperature. The results are shown in Table 2.

TABLE 2

| Formulation | Castor wax (%) | Bleached wheat flour (%) | Qualiwax-C | NBTPT (%) | DCD | Others (%) | Water added (%) | Physical strength |
|---|---|---|---|---|---|---|---|---|
| F-1 | 100 | — | — | — | — | | — | +++++ |
| F-2 | 98 | | | | | 02 (ZnO) | | +++++ |
| F-3 | 95 | | | 5 | | — | | +++++ |
| F-4 | 50 | 50 | | — | | | | +++++ |
| F-5 | — | 100 | | | | | 10 | +++++ |
| F-6 | | 95 | | 5 | | | 20 | +++++ |
| F-7 | | — | 100 | — | | | — | ++++ |
| F-8 | | | 95 | 5 | | | | ++++ |
| F-9 | | | 70 | — | 30 | | | +++++ |
| F-10 | | | 50 | — | | 50 (rice husk) | | +++++ |
| F-11 | | | 47.5 | 5 | — | 47.5 (rice husk) | | +++++ |
| F-12 | | | 35 | — | 30 | 35 (rice husk) | | +++++ |

Fertilizers with wax based binders could have some unique properties, such as; 1) delayed release of inner core inhibitor and/or micronutrients ingredients after initial urea release, and 2) unique biodegradability. In order to have an alternative system with alternative properties, extrusion experiments were carried out with other binders and fillers such as flours, starches, rice husk, plaster of Paris (PoP), etc. Initially, extrusions with different combination of binders and additives/fillers were performed using a wire press extruder (Table-3). This technique involves making a uniform mixture (in the form of dough) of all the constituents of a formulation and then extrusion. Since the experiments gave satisfactory results with bleached wheat flour as a binder, bleached wheat flour was used for further experimentation. In addition, different materials such as gluten, urea, colloidal silica, rice husk, carboxymethyl starch (CMS) solution and PoP were used in the formulations, see Table 3. Among these, colloidal silica and others gave acceptable extrudates. Urea as filler along with bleached wheat flour was also tried and successfully extruded up to 15%. Beyond 15% urea, the dough was very sticky and could not be extruded. The sticky nature of urea based dough was reduced significantly using rice husk along with urea and bleached wheat flour.

Some of the challenges observed during these experiments include the drying time and drying temperature. As high temperatures and long drying times would increase the cost of manufacturing, extrusion with PoP. PoP based formulations were tested, where water would evaporate quickly due to the heat generated when PoP comes in contact with water. As expected, upon using PoP the drying time was reduced to 1 h from 3 h at similar temperature. In fact, use of PoP is known in the literature for slow release of trace elements and pesticides (U.S. Pat. No. 3,499,748 to Fraser et al.). Initial experiments with PoP and bleached wheat flour showed that the maximum consumption of PoP was 60%, beyond which it was setting very fast. However, it is known in the literature that the PoP setting time can be delayed further by using certain additives like carboxymethyl starch (CMS) (U.S. Pat. No. 3,499,748 to Fraser et al.).

TABLE 3

| Formulation | Bleached wheat flour (%) | NBTPT (%) | Urea (%) | Colloidal Silica (40% in water) (%) | PoP (%) | Others (%) | Water added (%) | Crush strength (kgf*)/ Physical Strength |
|---|---|---|---|---|---|---|---|---|
| F-1 | 100 | — | — | — | — | — | 43 | 8.96 |
| F-2 | 98 | | | | | 2 (Gluten) | 43 | 14.36 |

TABLE 3-continued

| Formulation | Bleached wheat flour (%) | NBTPT (%) | Urea (%) | Colloidal Silica (40% in water) (%) | PoP (%) | Others (%) | Water added (%) | Crush strength (kgf*)/ Physical Strength |
|---|---|---|---|---|---|---|---|---|
| F-3 | 98 | 2 | — | | | | 43 | ++ |
| F-4 | 96 | 2 | | | | 2 (Gluten) | 43 | 3.68 |
| F-5 | 80 | — | 20 | | | — | 35 | 17.48 |
| F-6 | 60 | | 40 | | | | 32 | ++++ |
| F-7 | 80 | | — | | | 20 (DCD) | 45 | +++ |
| F-8 | 78 | | — | | | 20 (DCD) + 2 (Gluten) | 41 | 8.60 |
| F-9 | 80 | | 15 | 5 | | — | 27.5 | 29.64 |
| F-10 | 83 | 2 | 15 | — | | | 30 | ++ |
| F-11 | 81 | 4 | 15 | — | | | 30 | ++++ |
| F-12 | 68 | 2 | 15 | — | | 15 (Rice husk) | 35 | ++++ |
| F-13 | 68 | 2 | 15 | 15 | | — | 42.5 | +++ |
| F-14 | 80 | 5 | — | 15 | | | 47.5 | + |
| F-15 | 80 | — | — | | 20 | | 40 | ++++ |
| F-16 | 60 | | | | 40 | | 35 | ++++ |
| F-17 | 40 | | | | 60 | | 33 | +++ |
| F-18 | — | | | | 100 | | 28 | ++ |
| F-19 | — | | | | 100 | 2% CMS aq. solution | 40 | ++ |
| F-20 | 38 | 2 | | | 60 | — | 36 | +++ |
| F-21 | 20 | — | | | 60 | 20 (DCD) | 33 | +++ |

*The crush strength was measured for the pellet size of 1.5 mm diameter and 1 cm length.

Based on the results obtained from wire press extruder some of the formulations were tried in pilot scale room temperature twin screw banded extruder (F-26). This F-26 extruder was a horizontal counter current rotating type designed to create maximum pressure at die during extrusion. Before putting into this F-26 extruder, constituents were thoroughly mixed in a kneader with paddle type mixing set up. Extrusion was done under constant pressure created by dough at the die of F-26 extruder to maintain uniformity of the extrudates. Pressure can be controlled by adjusting the rotating speed of screws and feeding rate of material. The replication of extrusion from wire press to the pilot scale was successful. These results are shown in Table 4.

ability of extrudate in urea melt; and 2) to check the stability of inhibitors. Castor wax extrudates with and without inhibitors sustain the urea melt conditions under 5 seconds but inhibitors (NBTPT and DCD) were stable under these conditions. Bleached wheat flour containing extrudates sustained the urea melt temperature (133-135° C.). High melt waxes are taken in to consideration in order to mitigate the problem of possible deformation of wax extrudates when exposed to urea melt. The extrudates of high melt waxes were exposed to urea melt. Among them, specifically Qualiwax-C extrudates showed to be promising. The stability of NBTPT and DCD under urea melt temperature were analyzed and confirmed by HPLC and LCMS.

TABLE 4

| S. No: | Bleached wheat flour (%) | Urea (%) | POP (%) | Colloidal Silica (40% in water) (%) | Rice husk (%) | Others (%) | Water added (%) | Crush strength (kgf*)/physical strength |
|---|---|---|---|---|---|---|---|---|
| F-1 | 80 | — | — | — | — | 20 (DCD) | 20 | ++++ |
| F-2 | 96 | | | | | 2 (NBTPT) + 2 (Gluten) | 29 | 11.19 |
| F-3 | 65 | 20 | | 15 | | — | 28.1 | ++++ |
| F-4 | 70 | 15 | | — | 15 | | 16.6 | +++++ |
| F-5 | 65 | 20 | | | 15 | | 18 | +++++ |
| F-6 | — | — | | 10 | 90 | | 48.3 | + |
| F-7 | 20 | | 60 | 20 | — | | 49 | ++++ |
| F-8 | 20 | 20 | 60 | — | | | 20 | ++++ |
| F-9 | — | 15 | 60 | | 25 | | 40 | ++ |

*The crush strength was measured for the pellet size of 1.5 mm diameter and 1 cm length.

v. Inhibitor Stability Studies in Urea Melt

Figure 1C:
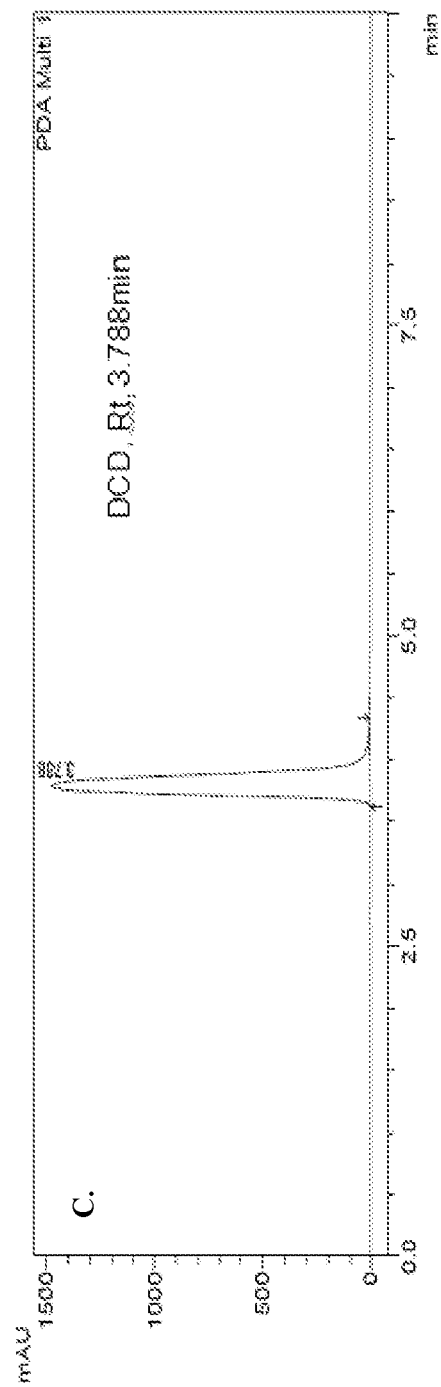

Extrudates containing NBTPT/DCD were dipped in urea melt in order to check the stability of the extrudates. Two types of studies were performed, 1) to check the deformation The HPLC analysis was done for the commercially available NBTPT, DCD and urea and the retention time is shown in FIG. 1A-1C.

Figures 2A, 2B:
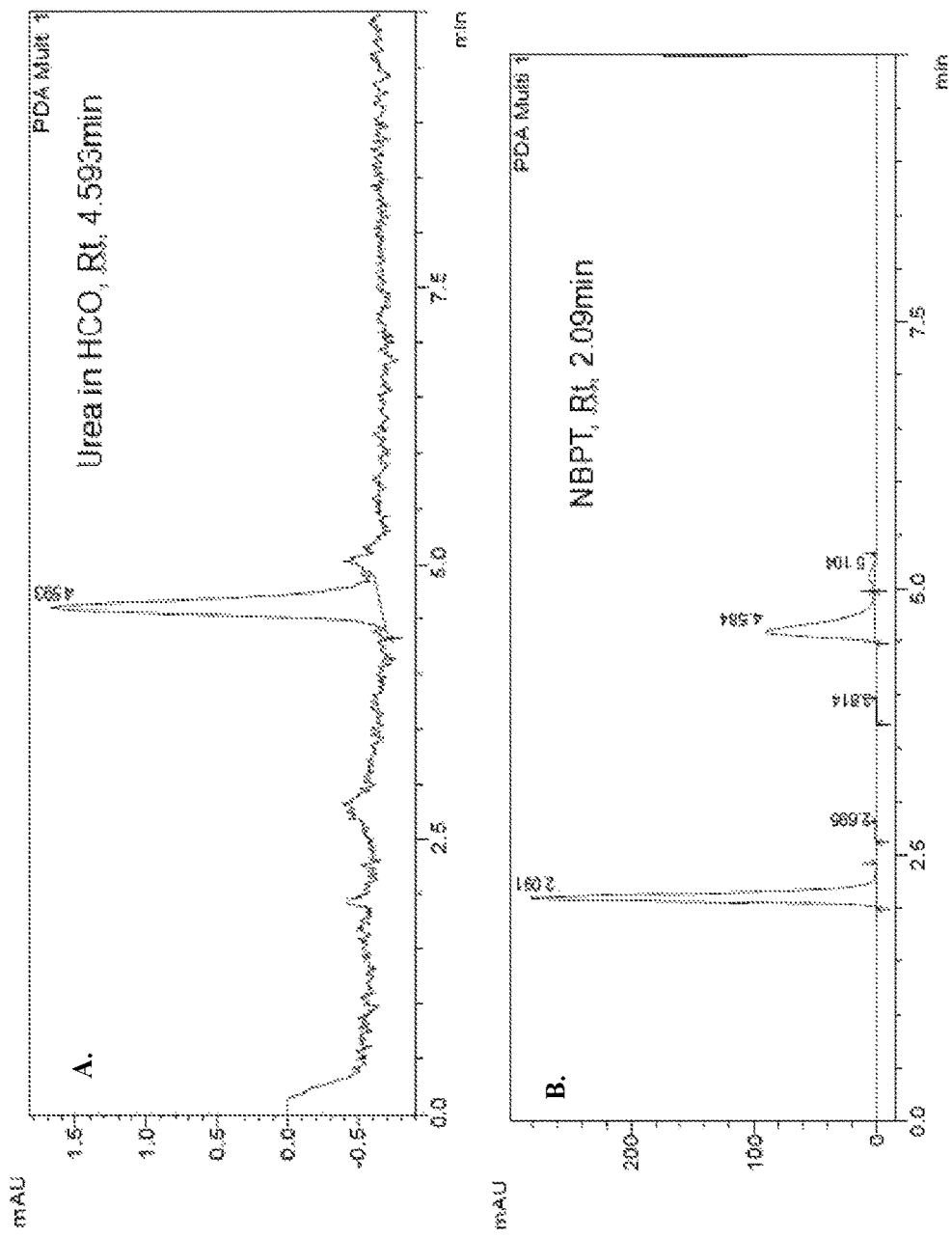
FIG. 2A-2C show the HPLC data of extrudates of castor wax and castor wax containing inhibitors under urea melt conditions.
Figure 2C:
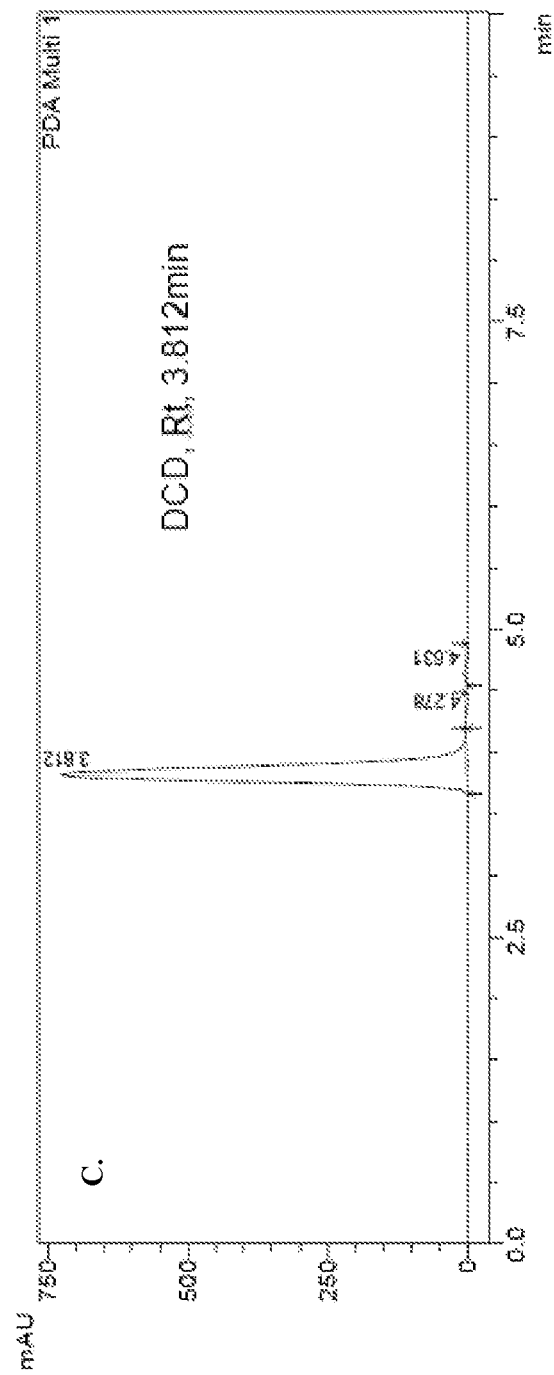

HPLC data of extrudates of castor wax and castor wax containing inhibitors under urea melt conditions is shown in FIG. 2A-2C. The HPLC data showed in 1) hydrogenated castor oil (HCO) in urea melt as a control; even after washing with water (twice), very little urea peak of HCO was observed in control 2) castor wax containing NBTPT in urea melt conditions; no degradation of NBTPT observed in HPLC. Apart from NBTPT peak at 2.09 min, only urea peak was observed which supposed to be from the urea melt. 3) castor wax containing DCD in urea melt conditions; there was no degradation of DCD (rt, 3.81 min) was observed in HPLC under these conditions.

Figures 3A, 3B:
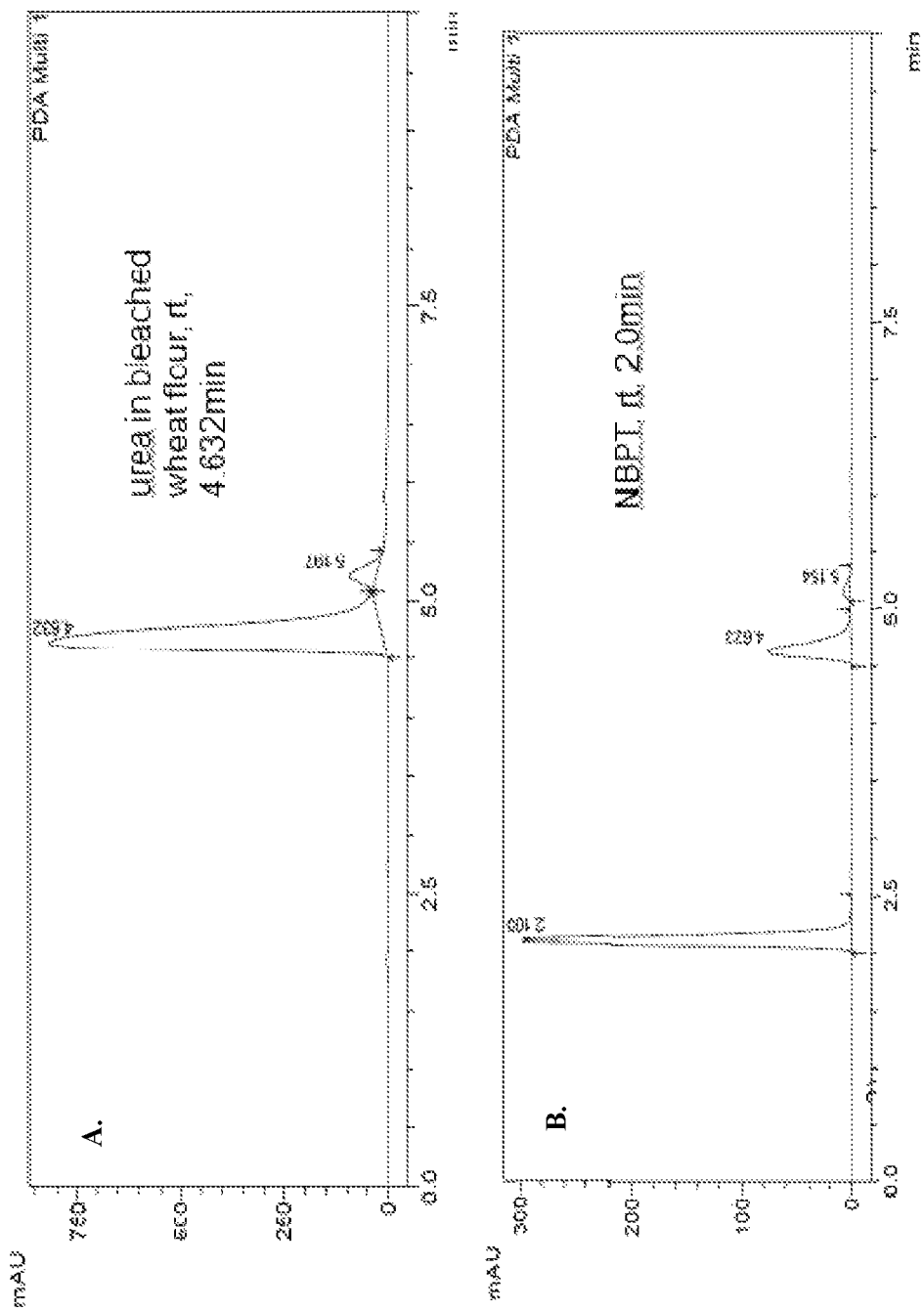
FIG. 3A-3C show the HPLC data of extrudates of bleached wheat flour and bleached wheat flour containing inhibitors under urea melt conditions.
Figure 3C:
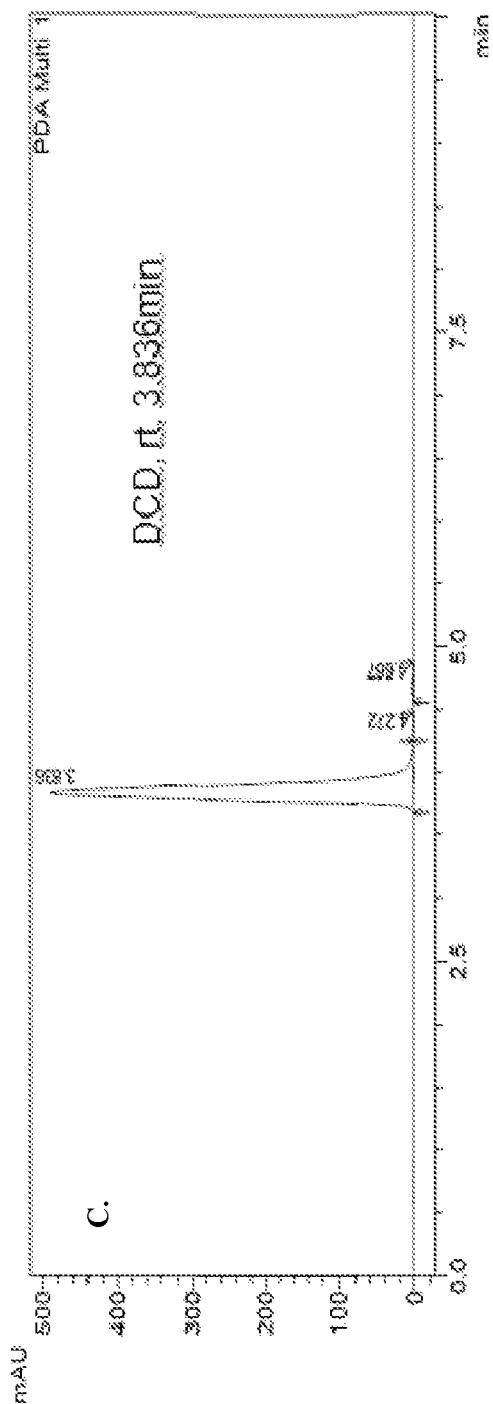

HPLC data of extrudates of bleached wheat flour and bleached wheat flour containing inhibitors under urea melt conditions is shown in FIG. 3A-3C. The HPLC data showed in 1) bleached wheat flour in urea melt as a control, large urea peak was seen in control even after washing with water and other small peak refers to bleached wheat flour extract 2) bleached wheat flour containing NBTPT in urea melt conditions, no degradation of NBTPT was observed in HPLC. Apart from NBTPT peak at 2.0 min, only little urea peak was observed which supposed to be from the urea melt and other small hump from bleached wheat flour extract. 3) bleached wheat flour containing DCD in urea melt conditions, there was no degradation of DCD (rt, 3.83 min) was observed in HPLC under these conditions.

The thermal stability of neat NBTPT and NBTPT within a core was determined by HPLC. The core for this example contained 58.8 wt % PoP, 39.2 wt % bleached wheat flour, and 2.0 wt % NBTPT. Both neat NBTPT and NBTPT within a core were exposed to 133-135° C., which is the typical urea melt temperature. FIG. 4 shows the HPLC results for neat NBTPT. FIG. 5 shows the HPLC results for NBTPT within a core. The HPLC analysis of NBTPT within a core showed no decomposition for up to 30 min. Neat NBTPT showed significant degradation under urea melt temperature (FIGS. 4 and 5). The data indicates the core protects fertilizer additive materials, such as an inhibitor, from degradation during manufacturing conditions, including the expose of temperatures associated with a urea melt. The thermal stability of materials, such as an inhibitor is critical for its good performance (inhibition) in the soil. The intended function of a material, such as an inhibitor, can be lost if the material degrades when exposed to high temperatures during the manufacturing process.

2. Example 2

Two exemplary fertilizer compositions were made having the composition described in Table 5.

to cool to room temperature. The cores were then fattened with urea through a granulation process in a fluid bed system.

What is claimed is:

1. A fertilizer capsule comprising one or more cores and an outer shell that at least partially surrounds each of the one or more cores, each of the one or more cores independently comprising one or more fertilizer additives and 10 wt. % to 99 wt. % of an extrudable binder, wherein the outer shell comprises one or more nitrogen fertilizers, wherein the one or more fertilizer additives comprise a urease inhibitor or a nitrification inhibitor, or a combination thereof, and wherein the binder comprises plaster of Paris and flour.

2. The fertilizer capsule of claim 1, wherein each of the one or more cores comprises from 40 wt. % to 90 wt. % of the binder.

3. The fertilizer capsule of claim 1, wherein the fertilizer capsule comprises two or more cores.

4. The fertilizer capsule of claim 1, wherein the one or more fertilizer additives further comprise a micronutrient, a primary nutrient, or a secondary nutrient, or combination thereof.

5. The fertilizer capsule of claim 1, wherein the one or more fertilizer additives further comprise a micronutrient.

6. The fertilizer capsule of claim 1, wherein the inhibitor comprises a urease inhibitor and a nitrification inhibitor.

7. The fertilizer capsule of claim 1, wherein the urease inhibitor comprises N-(n-butyl) thiophosphoric triamide (NBTPT) or phenyl phosphorodiamidate (PPDA), or a combination thereof, and wherein the nitrification inhibitor comprises 3,4-dimethylpyrazole phosphate (DMPP), thio-urea (TU), dicyandiamide (DCD), 2-chloro-6-(trichloromethyl)-pyridine (Nitrapyrin), 5-ethoxy-3-trichloromethyl-1,2,4-thiadiazol (Terrazole), 2-amino-4-chloro-6-methyl-pyrimidine (AM), 2-mercapto-benzothiazole (MBT), or 2-sulfanimalamidothiazole (ST), or a combination thereof.

8. The fertilizer capsule of claim 5, wherein the micronutrient comprises inorganic or organometallic compounds of boron (B), copper (Cu), iron (Fe), chloride (Cl), manganese (Mn), molybdenum (Mo), nickel (Ni) or zinc (Zn), or a combination thereof.

9. The fertilizer capsule of claim 1, wherein each of the one or more cores independently comprises from 10 wt. % to 50 wt. % of the one or more fertilizer additives.

10. The fertilizer capsule of claim 1, wherein the outer shell comprises urea.

TABLE 5

| Sample | Core | | | | Shell |
|---|---|---|---|---|---|
| A | Plaster of Paris - 2.41 wt % of total composition (48.30 wt % of the core) | Bleached Wheat Flour - 1.61 wt % of total composition (32.26 wt % of the core) | DCD - 0.90 wt % of total composition (18.04 wt % of the core) | NBTPT - 0.07 wt % of total composition (1.40 wt % of the core) | Urea - 95.01 wt % of total composition (100 wt % of the shell) |
| B | Plaster of Paris - 1.70 wt % of total composition (34.07 wt % of the core) | Bleached Wheat Flour - 1.15 wt % of total composition (23.05 wt % of the core) | DCD - 2.05 wt % of total composition (41.08 wt % of the core) | NBTPT - 0.09 wt % of total composition (1.80 wt % of the core) | Urea - 95.01 wt % of total composition (100 wt % of the shell) |

Sample A and B, in Table 5, were made as follows. The materials were weighed accurately and mixed thoroughly. The compounding operations were carried out in a W&P ZSK25 Twin Screw Extruder with a 25 mm diameter screw on a 6-barrel system. The experiments were carried out at a processing temperature of 35° C. Screw speed was kept around 100 rpm and the material was added through the main hopper at 6 kg/hr. The extrudates were collected out of the die at the end of the extruder in a tray and then allowed 11. The fertilizer capsule of claim 1, wherein the outer shell fully surrounds each of the one or more cores.

12. The fertilizer capsule of claim 1, consisting of one core and one or more shell(s).

13. The fertilizer capsule of claim 1, wherein the flour comprises bleached wheat flour.

14. The fertilizer capsule of claim 1, wherein each of the one or more cores independently further comprises a filler, wherein the filler comprises silica, colloidal silica, rice husk, dried distillers grains with solubles (DDGS), kaolin, bentonite, or other biomaterial, or a combination thereof.

15. The fertilizer capsule of claim 1, wherein each of the one or more cores comprises from 30 wt. % to 50 wt. % of plaster of Paris and from 20 wt. % to 40 wt. % of flour.

16. The fertilizer capsule of claim 15, wherein each of the one or more cores comprises from 10 wt. % to 50 wt. % of DCD and from more than 0 wt. % to 5 wt. % of NBTPT.

17. The fertilizer capsule of claim 1, wherein the core is configured to reduce an amount of the urease inhibitor, the nitrification inhibitor, or the combination thereof degraded when the core is exposed to a temperature of 130° C. or greater as compared to an amount degraded when a core not comprising the binder is exposed to a temperature of 130° C. or greater.

18. A method for preparing the fertilizer capsule of claim 1, the method comprising the step of: a) extruding a mixture comprising the one or more fertilizer additives and the extrudable binder, thereby forming the core.

19. The method of claim 18, wherein extruding comprises extruding from a extruder at a temperature from 0° C. to 140° C. and a screw speed from 1 to 500 rpm, wherein the extruder comprises a multi-feeder comprising extrusion components.

20. The method of claim 18, wherein the method further comprises the step of fattening the core with the outer shell comprising the one or more nitrogen fertilizers, thereby forming the fertilizer capsule.

* * * * *